(12) United States Patent
Kawabata

(10) Patent No.: US 11,055,042 B2
(45) Date of Patent: Jul. 6, 2021

(54) IMAGE FORMING APPARATUS AND METHOD FOR CONTROLLING IMAGE FORMING APPARATUS

(71) Applicant: KONICA MINOLTA, INC., Tokyo (JP)

(72) Inventor: Hiroyuki Kawabata, Kawanishi (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 16/843,945

(22) Filed: Apr. 9, 2020

(65) Prior Publication Data
US 2020/0356323 A1 Nov. 12, 2020

(30) Foreign Application Priority Data
May 10, 2019 (JP) .............................. JP2019-089734

(51) Int. Cl.
| | |
|---|---|
| *G06F 15/00* | (2006.01) |
| *G06F 3/12* | (2006.01) |
| *G06K 1/00* | (2006.01) |
| *G06F 3/16* | (2006.01) |
| *H04N 1/00* | (2006.01) |

(52) U.S. Cl.
CPC .......... *G06F 3/1238* (2013.01); *G06F 3/1222* (2013.01); *G06F 3/1284* (2013.01); *G06F 3/167* (2013.01); *H04N 1/00403* (2013.01)

(58) Field of Classification Search
CPC .... G06F 3/1238; G06F 3/1222; G06F 3/1284; G06F 3/167; H04N 1/00403
USPC ............................... 358/1.15, 1.13, 1.14, 1.1
See application file for complete search history.

(56) References Cited

U.S. PATENT DOCUMENTS

| | | | | |
|---|---|---|---|---|
| 2003/0218642 | A1* | 11/2003 | Sakayori | H04N 1/00384 715/853 |
| 2004/0121790 | A1* | 6/2004 | Wolff | G06F 16/685 455/518 |
| 2012/0089392 | A1* | 4/2012 | Larco | G10L 15/063 704/231 |
| 2014/0331189 | A1* | 11/2014 | Lee | G06F 3/04883 715/863 |
| 2016/0234356 | A1* | 8/2016 | Thomas | H05K 9/0069 |
| 2019/0189120 | A1* | 6/2019 | Sohn | G06F 3/167 |
| 2020/0267268 | A1* | 8/2020 | Yokoyama | G03G 15/502 |

FOREIGN PATENT DOCUMENTS

JP 2006215206 A 8/2006

\* cited by examiner

*Primary Examiner* — Douglas Q Tran
(74) *Attorney, Agent, or Firm* — Buchanan Ingersoll & Rooney PC

(57) ABSTRACT

An image forming apparatus includes: a first hardware processor that outputs guidance information for setting a predetermined function to a user; a second hardware processor that receives voice input from the user according to the guidance information; a third hardware processor that executes a process of setting the predetermined function according to the voice input received by the second hardware processor; and a fourth hardware processor that outputs a masking signal for masking voice from the user based on the guidance information.

6 Claims, 23 Drawing Sheets

FIG. 7

| No. | INPUT ITEM | INPUT EXAMPLE | CONFIDENTIAL FLAG |
|---|---|---|---|
| 1 | USER NAME | Yamada | ABSENT |
| 2 | PASSWORD | Abc123 | PRESENT |
| 3 | USE FUNCTION | SCAN AND MAIL SENDING | ABSENT |
| 4 | DESTINATION | suzuki@hoge.com | PRESENT |
| 5 | DOCUMENT COLOR | COLOR | ABSENT |
| 6 | FILE FORMAT | PDF | ABSENT |

| No. | INPUT ITEM | INPUT EXAMPLE | CONFIDENTIAL FLAG |
|---|---|---|---|
| 1 | USER NAME | Yamada | ABSENT |
| 3 | USE FUNCTION | SCAN AND MAIL SENDING | ABSENT |
| 5 | DOCUMENT COLOR | COLOR | ABSENT |
| 6 | FILE FORMAT | PDF | ABSENT |
| 2 | PASSWORD | Abc123 | PRESENT |
| 4 | DESTINATION | suzuki@hoge.com | PRESENT |

| No. | INPUT ITEM | INPUT EXAMPLE | CONFIDENTIAL FLAG |
|---|---|---|---|
| 1 | USER NAME | Yamada | ABSENT |
| 3 | USE FUNCTION | SCAN AND MAIL SENDING | ABSENT |
| 5 | DOCUMENT COLOR | COLOR | ABSENT |
| 6 | FILE FORMAT | PDF → ENCRYPTED PDF | ABSENT |
| 2 | PASSWORD | Abc123 | PRESENT |
| 4 | DESTINATION | suzuki@hoge.com | PRESENT |
| 7 | ENCRYPTION KEY | 123 | PRESENT |

|  |  | PDF | |
|---|---|---|---|
|  |  | ENCRYPTED | NOT ENCRYPTED |
| MAIL DESTINATION | INSIDE COMPANY | ○ | ○ |
| | OUTSIDE COMPANY | ○ | × |

IMAGE FORMING APPARATUS AND METHOD FOR CONTROLLING IMAGE FORMING APPARATUS

The entire disclosure of Japanese patent Application No. 2019-089734, filed on May 10, 2019, is incorporated herein by reference in its entirety.

BACKGROUND

Technological Field

The present disclosure relates to an image forming apparatus, and relates to an image forming apparatus operated by voice input.

Description of the Related Art

There has been an increasing demand for an operation by voice input with respect to a multi-functional peripheral (MFP).

In a case of connection to a cloud, it is necessary to log in with an account linked to the cloud. In a case of logging in by an operation by voice input, it is necessary to input a password by voice.

Therefore, in a case of inputting a password by voice, there is a high possibility that another person will hear the password, and the password may be leaked. That is, this poses a security problem.

In this regard, JP 2006-215206 A discloses a method for outputting a masking signal for masking a voice generated by a user to another person.

However, JP 2006-215206 A discloses a case where a masking signal is continuously output from a start of voice input to an end of the voice input. That is, a masking signal is output also for voice input other than contents related to security of a user.

Therefore, in a case where a user verbally confirms an operation method in front of an MFP, or in a case where a user stands chatting near the MFP, a masking signal is also output similarly, which may make normal conversation difficult, and may make another person therearound feel uncomfortable.

SUMMARY

The present disclosure has been achieved in view of the above background, and relates to an image forming apparatus that can provide a comfortable environment to another person while enhancing security in a case of performing an operation by voice input, and a method for controlling the image forming apparatus.

To achieve the abovementioned object, according to an aspect of the present invention, an image forming apparatus reflecting one aspect of the present invention comprises: a first hardware processor that outputs guidance information for setting a predetermined function to a user; a second hardware processor that receives voice input from the user according to the guidance information; a third hardware processor that executes a process of setting the predetermined function according to the voice input received by the second hardware processor; and a fourth hardware processor that outputs a masking signal for masking voice from the user based on the guidance information.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 7 is a diagram for explaining a setting table for executing a process of setting a predetermined function based on the first embodiment;

FIG. 11 is a diagram for explaining a setting table for executing a process of setting a predetermined function based on the second embodiment;

FIG. 16 is a diagram for explaining a setting table for executing a process of setting a predetermined function based on a fourth embodiment;

FIG. 17 is a diagram for explaining a table indicating a prohibition condition according to the fourth embodiment;

DETAILED DESCRIPTION OF EMBODIMENTS

Figure 1:
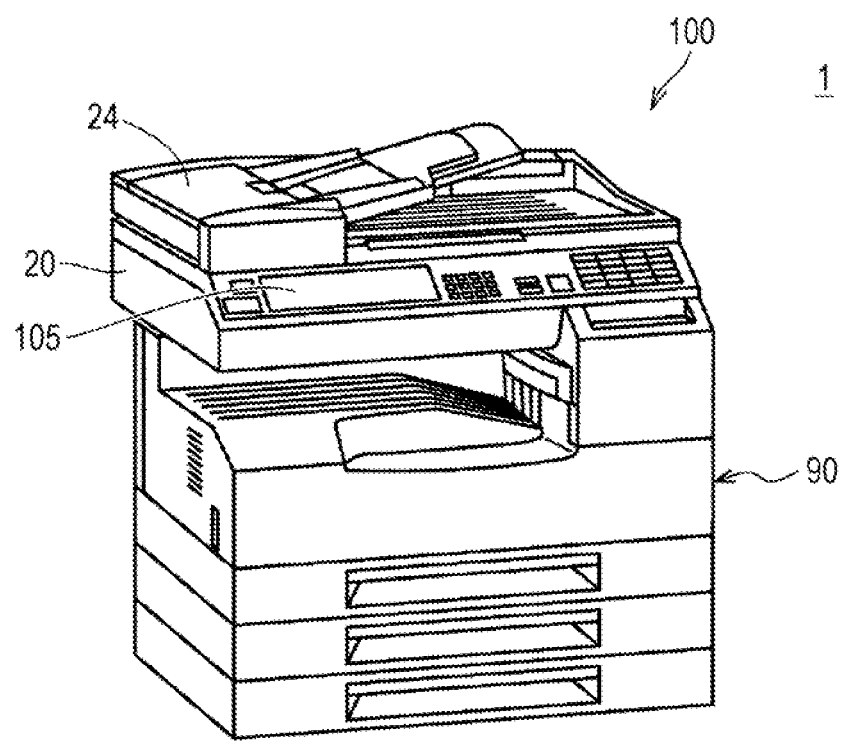
FIG. 1 is a view for explaining an appearance of an image forming apparatus.

Hereinafter, one or more embodiments of a technical idea of the present invention will be described with reference to the drawings. However, the scope of the invention is not limited to the disclosed embodiments. In the following description, the same parts are denoted by the same reference numeral. The names thereof and the functions thereof are also the same. Therefore, detailed description thereof will not be repeated.

In the following embodiments, examples of the image forming apparatus include an MFP, a printer, a copier, and a facsimile.

First Embodiment

[1. Configuration of Image Forming Apparatus 1]

FIG. 1 is a view for explaining an appearance of an image forming apparatus 1.

With reference to FIG. 1, the image forming apparatus 1 is illustrated as a color printer. Hereinafter, the image forming apparatus 1 as a color printer will be described, but the image forming apparatus 1 is not limited to the color printer. For example, the image forming apparatus 1 may be a monochrome printer, or a multifunction machine of a monochrome printer or a color printer and a facsimile (so-called multi-functional peripheral (MFP)).

The image forming apparatus 1 includes a scanner 20 as an image reader and a printer 25. The scanner 20 includes an auto document feeder (ADF) 24.

The image forming apparatus 1 includes an operation panel 105. In the first embodiment, a case will be described in which an operation is performed by voice input as an operation for setting a predetermined function on the operation panel 105.

Figure 2:
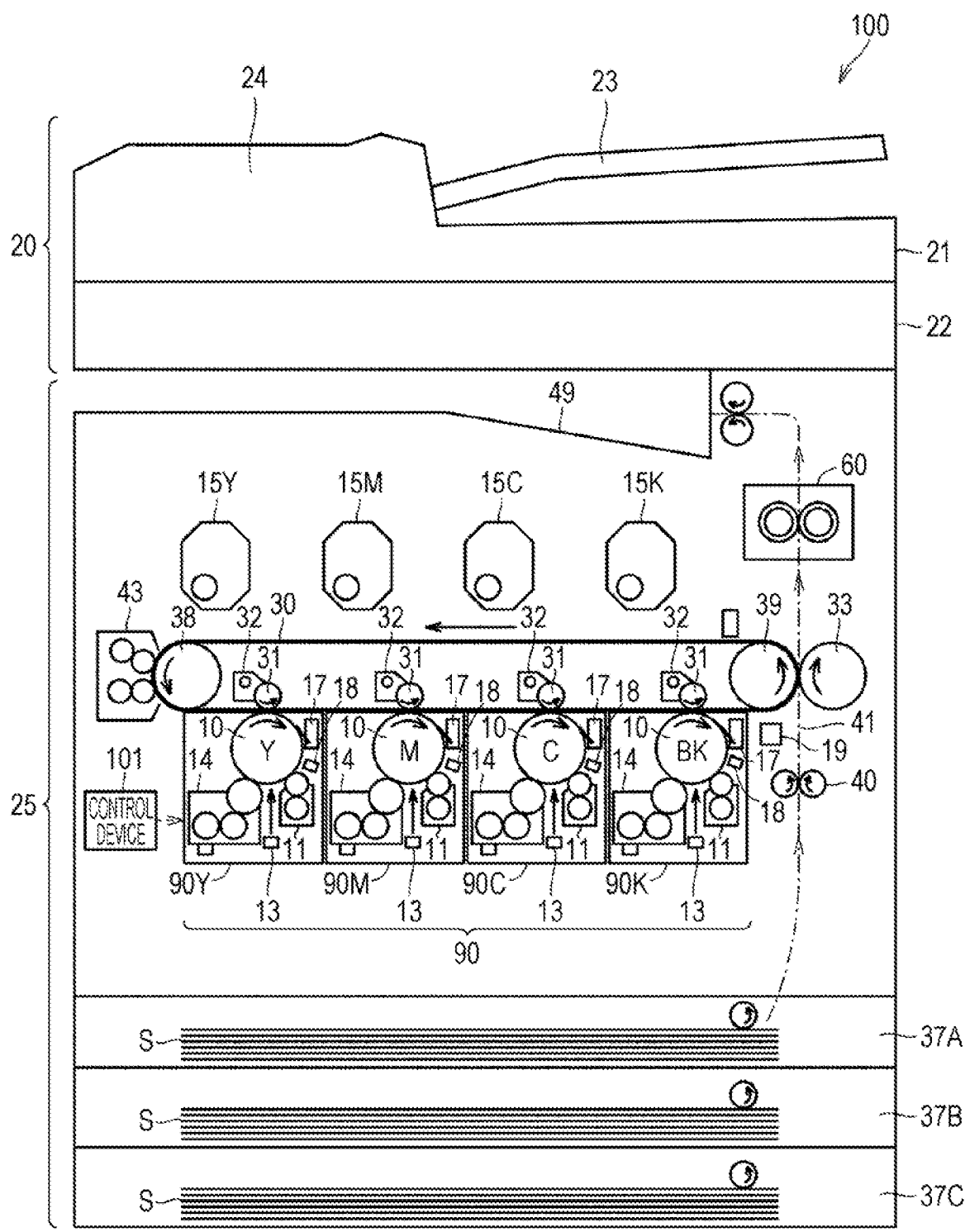
FIG. 2 is a view for explaining a configuration of the image forming apparatus.

FIG. 2 is a view for explaining a configuration of the image forming apparatus 1.

With reference to FIG. 2, the scanner 20 is disposed on an upper portion of the image forming apparatus 1. The scanner 20 includes a cover 21, a sheet table 22, a tray 23, and an ADF 24. One end of the cover 21 is fixed to the sheet table 22, and the cover 21 can open and close with the one end as a fulcrum. An operator can set a document on the sheet table 22 by opening the cover 21. When the image forming apparatus 1 receives a scan instruction in a state where a document is set on the sheet table 22, the image forming apparatus 1 starts scanning the document set on the sheet table 22. When the image forming apparatus 1 receives a scan instruction in a state where a document is set on the tray 23, the image forming apparatus 1 automatically reads sheets of the document one by one with the ADF 24.

The printer 25 includes image forming units 90Y, 90M, 90C, and 90K, an image density control (IDC) sensor 19, a transfer belt 30, a primary transfer roller 31, a transfer driver 32, a secondary transfer roller 33, cassettes 37A to 37C, a driven roller 38, a driving roller 39, a timing roller 40, a cleaning unit 43, and a fixing device 70.

The image forming units 90Y, 90M, 90C, and 90K are sequentially arranged along the transfer belt 30. The image forming unit 90Y receives supply of toner from a toner bottle 15Y and forms a yellow (Y) toner image. The image forming unit 90M receives supply of toner from a toner bottle 15M and forms a magenta (M) toner image. The image forming unit 90C receives supply of toner from a toner bottle 15C and forms a cyan (C) toner image. The image forming unit 90K receives supply of toner from a toner bottle 15K and forms a black (BK) toner image.

The image forming units 90Y, 90M, 90C, and 90K are arranged along the transfer belt 30 in a rotation direction of the transfer belt 30. Each of the image forming units 90Y, 90M, 90C, and 90K includes a photoreceptor 10 that is rotatable, a charging device 11, an exposing device 13, a developing device 14, a cleaning unit 17, and a toner sensor 18.

Each of the image forming units 90Y, 90M, 90C, and 90K operates as described above. Thereafter, by transfer of the transfer driver 32, a yellow (Y) toner image, a magenta (M) toner image, a cyan (C) toner image, and a black (BK) toner image are sequentially superimposed and transferred from the photoreceptor 10 to the transfer belt 30. As a result, a color toner image is formed on the transfer belt 30.

An IDC sensor 19 detects the density of a toner image 35 formed on the transfer belt 30. Typically, the IDC sensor 19 is a light intensity sensor constituted by a reflection type photo sensor, and detects the intensity of light reflected from a surface of the transfer belt 30.

The transfer belt 30 is stretched between the driven roller 38 and the driving roller 39. The driving roller 39 is connected to a motor (not illustrated). By controlling the motor, the driving roller 39 rotates. The transfer belt 30 and the driven roller 38 rotate in conjunction with the driving roller 39. As a result, the toner image 35 on the transfer belt 30 is sent to the secondary transfer roller 33.

In each of the cassettes 37A to 37C, a sheet is set, in which the size of the sheet in the cassette 37A, the size of the sheet in the cassette 37B, and the size of the sheet in the cassette 37C are different from one another. The sheet is an example of a recording medium. The sheets are sent to the secondary transfer roller 33 along a conveyance path 41 by a timing roller 40 one by one from any of the cassettes 37A to 37C. A transfer voltage applied to the secondary transfer roller 33 is controlled in accordance with a timing at which the sheet is sent out.

The secondary transfer roller 33 applies a transfer voltage having a polarity opposite to the charge polarity of the toner image 35 to a sheet being conveyed. As a result, the toner image 35 is attracted from the transfer belt 30 to the secondary transfer roller 33, and the toner image 35 on the transfer belt 30 is transferred. The timing of conveying the sheet to the secondary transfer roller 33 is controlled by the timing roller 40 in accordance with the position of the toner image 35 on the transfer belt 30. As a result, the toner image 35 on the transfer belt 30 is transferred to an appropriate position on the sheet.

The fixing device 70 presses and heats a sheet passing through the fixing device 70. As a result, a toner image is fixed to the sheet. Thereafter, the sheet is discharged to a tray 49.

The cleaning unit 43 collects toner remaining on a surface of the transfer belt 30 after transfer of a toner image from the transfer belt 30 to a sheet. The collected toner is conveyed by a conveyance screw (not illustrated) and stored in a waste toner container (not illustrated).

[2. Hardware Configuration]

Figure 3:
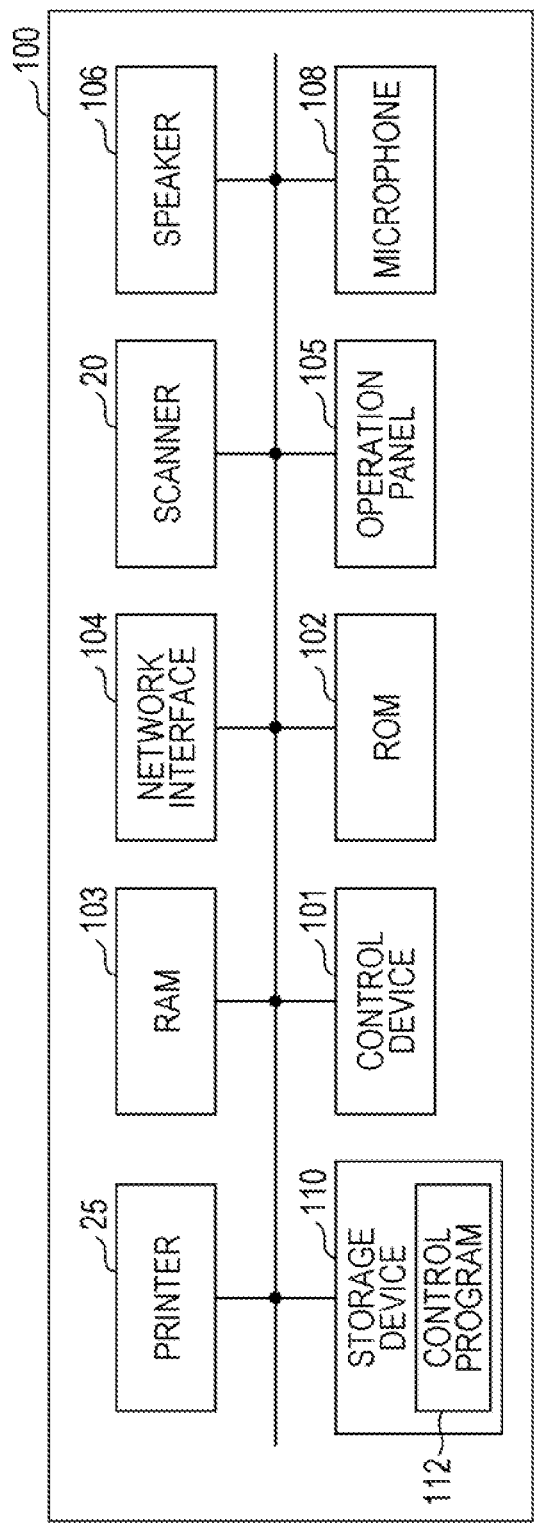
FIG. 3 is a block diagram illustrating a main hardware configuration of the image forming apparatus.

FIG. 3 is a block diagram illustrating a main hardware configuration of the image forming apparatus 1.

With reference to FIG. 3, an example of a hardware configuration of the image forming apparatus 1 will be described.

The image forming apparatus 1 includes, in addition to the scanner 20 and the printer 25, a control device 101, a read only memory (ROM) 102, a random access memory (RAM) 103, a network interface 104, the operation panel 105, a speaker 106, a microphone 108, and a storage device 110.

The control device 101 includes, for example, at least one integrated circuit. The integrated circuit includes, for example, at least one central processing unit (CPU), at least one application specific integrated circuit (ASIC), at least one field programmable gate array (FPGA), or a combination thereof.

The control device 101 controls an operation of the image forming apparatus 1 by executing various programs for adjusting a control parameter of the image forming apparatus 1, such as a program 112.

The control device 101 reads the program 112 from the storage device 110 to the RAM 103 based on reception of an execution instruction of the program 112. The RAM 103 functions as a working memory, and temporarily stores various pieces of data necessary for executing the program 112.

To the network interface 104, an antenna (not illustrated) and the like are connected. The image forming apparatus 1 exchanges data with an external communication device via an antenna. The external communication device includes, for example, a mobile communication terminal such as a smartphone and a server. The image forming apparatus 1 may be able to download the program 112 from a server via an antenna.

The operation panel 105 includes a display and a touch panel. The display and the touch panel are superimposed on each other, and receive an operation on the image forming apparatus 1 by a touch operation. As an example, the operation panel 105 receives various setting operations and the like.

The storage device 110 is, for example, a hard disk, a solid state drive (SSD), or another storage device. The storage device 110 may be either a built-in type or an external type. The storage device 110 stores the program 112 and the like according to the present embodiment. However, a storage location of the program 112 is not limited to the storage device 110, and the program 112 may be stored in a storage area (for example, a cache) of the control device 101, the ROM 102, the RAM 103, an external device (for example, a server), or the like.

The program 112 may be provided as a part of an arbitrary program, not as a single program. In this case, a control process according to the present embodiment is implemented in cooperation with an arbitrary program. Even such a program not including some modules does not depart from the gist of the program 112 according to the present embodiment.

Furthermore, some or all of functions provided by the program 112 may be implemented by dedicated hardware. Furthermore, the image forming apparatus 1 may have a form such as a so-called cloud service in which at least one server executes a part of a process of the program 112.

The speaker 106 outputs voice to the outside. In the present embodiment, guidance information for setting a predetermined function is output to a user by voice. In addition, a masking signal for masking voice from a user is output.

The microphone 108 receives voice input from a user.

Figure 4:
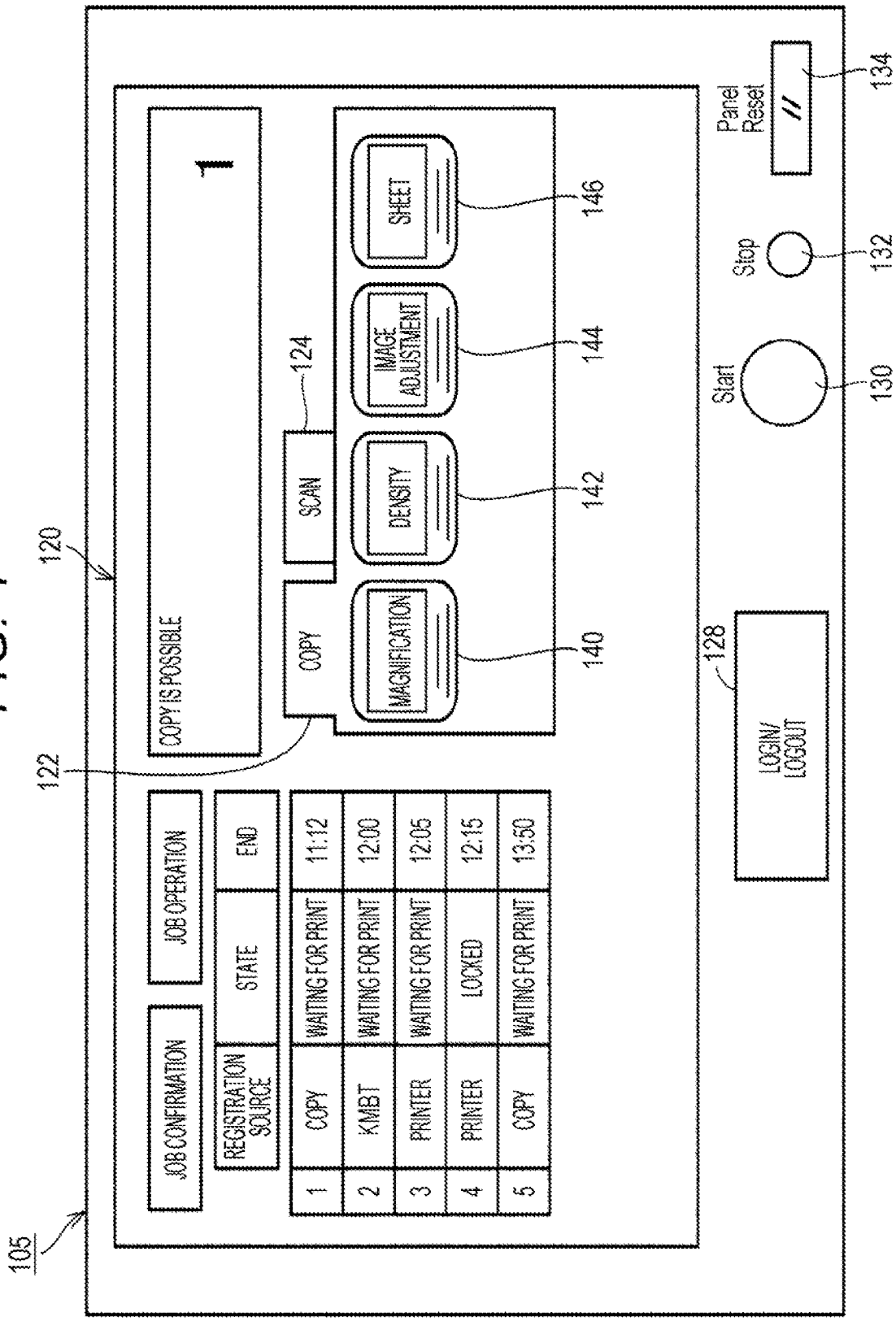
FIG. 4 is a diagram for explaining an operation panel of the image forming apparatus.

FIG. 4 is a diagram for explaining the operation panel 105 of the image forming apparatus 1.

With reference to FIG. 4, the operation panel 105 includes a start key 130, a stop key 132, a panel reset key 134, a login/logout button 128, and an operation display 120.

The start key 130 is used in order to start an operation such as copy/scan. The stop key 132 is used in order to instruct stop of a copy/scan operation. The panel reset key 134 is used in order to discard a set mode and job. The login/logout button 128 is used in order to perform login input or logout input when the operation panel 105 is operated.

To the operation display 120, a touch panel is attached in order to execute display of various modes, setting, and the like.

With this touch panel, an operator can perform various settings in accordance with display contents in the operation display 120. In a setting screen area of the touch panel, buttons for basic/applied settings to be usually performed when a copy operation or a scan operation is executed are arranged. When each of the buttons is pressed, a hierarchical screen for performing detailed setting therefor is displayed.

In the present embodiment, as an example, an area of various detailed settings for executing a copy operation is illustrated, and within the area, an icon 140 for adjusting a magnification, an icon 142 for adjusting a density, an icon 144 for adjusting an image, and an icon 146 for setting a sheet are disposed.

In the present embodiment, the icons for various detailed settings in a case where a copy operation is executed have been described, but a similar detailed setting area is displayed for a scan operation.

Job information input to the image forming apparatus 1 at that time is displayed in a job information screen area on the left. Jobs are arranged in the order of a job to be executed. In a case where an operation such as deletion or change is performed for a specific job, a job operation button is selected, and then a job number button to be operated is pressed. By these operations, a job operation screen is displayed, and an operation for a specific job can be performed.

A copy key 122 and a scan key 124 are selection keys for setting whether the image forming apparatus 1 is operated in a mode of copy or scanner.

In a case where the copy key 122 is pressed, the image forming apparatus 1 can be used as a copy machine. In this state, a scanner operation cannot be executed.

In a case where the scan key 124 is pressed, the image forming apparatus 1 becomes a scanner. In this state, a copy operation cannot be executed.

Note that the copy key 122 and the scan key 124 operate exclusively, and when one is selected, the other is automatically non-selected.

The operation display 120 includes a setting confirmation button 126.

The setting confirmation button 126 is a button for displaying a preview image according to various settings.

[3. Functional Block]

Figure 5:
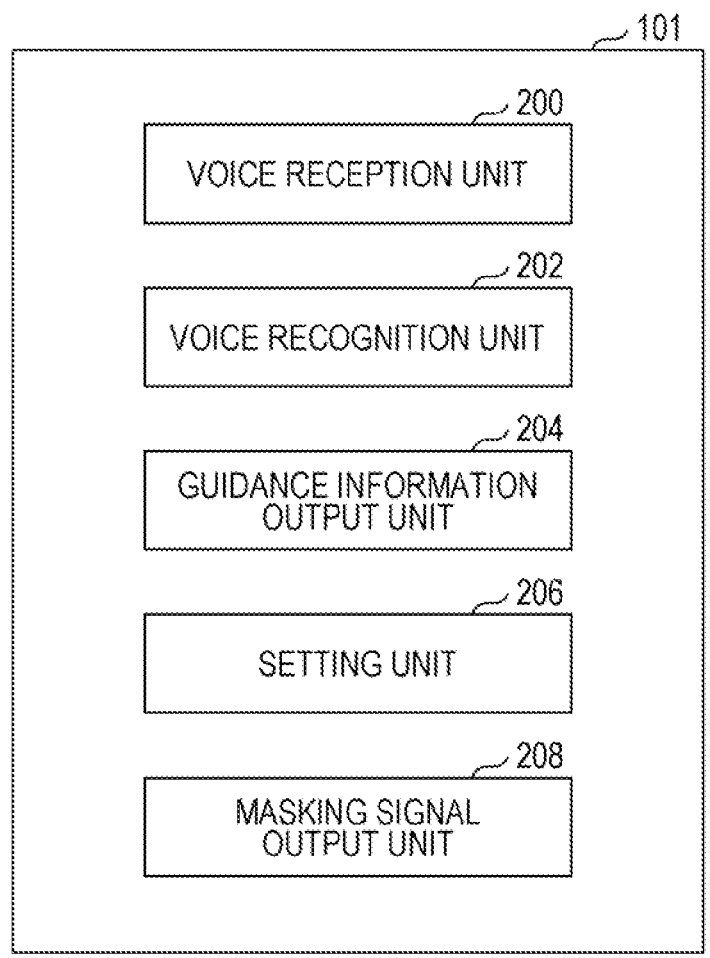
FIG. 5 is a diagram for explaining a functional block of a control device according to a first embodiment.

FIG. 5 is a diagram illustrating a functional block of the control device 101 according to the first embodiment.

With reference to FIG. 5, the functional block of the control device 101 is implemented by executing the program 112 of storage device 110.

The control device 101 includes a voice reception unit 200, a voice recognition unit 202, a guidance information output unit 204, a setting unit 206, and a masking signal output unit 208.

The voice reception unit 200 receives a user's voice input from the microphone 108. When receiving a user's voice input from the microphone 108, the voice reception unit 200 may cut off a frequency band of a masking signal by filtering and output only voice from the user to the voice recognition unit 202.

The voice recognition unit 202 recognizes information received by the voice reception unit 200 and input by voice, and outputs the information to the setting unit 206.

The guidance information output unit 204 outputs guidance information for setting a predetermined function to a user via the speaker 106.

The masking signal output unit 208 outputs a masking signal for masking voice from a user via the speaker 106 based on the guidance information.

The setting unit 206 executes a process of setting a predetermined function based on the information recognized by the voice recognition unit 202. In addition, the setting unit 206 instructs the guidance information output unit 204 to output predetermined guidance information. The setting unit 206 instructs the masking signal output unit 208 to output a masking signal.

Figure 6:
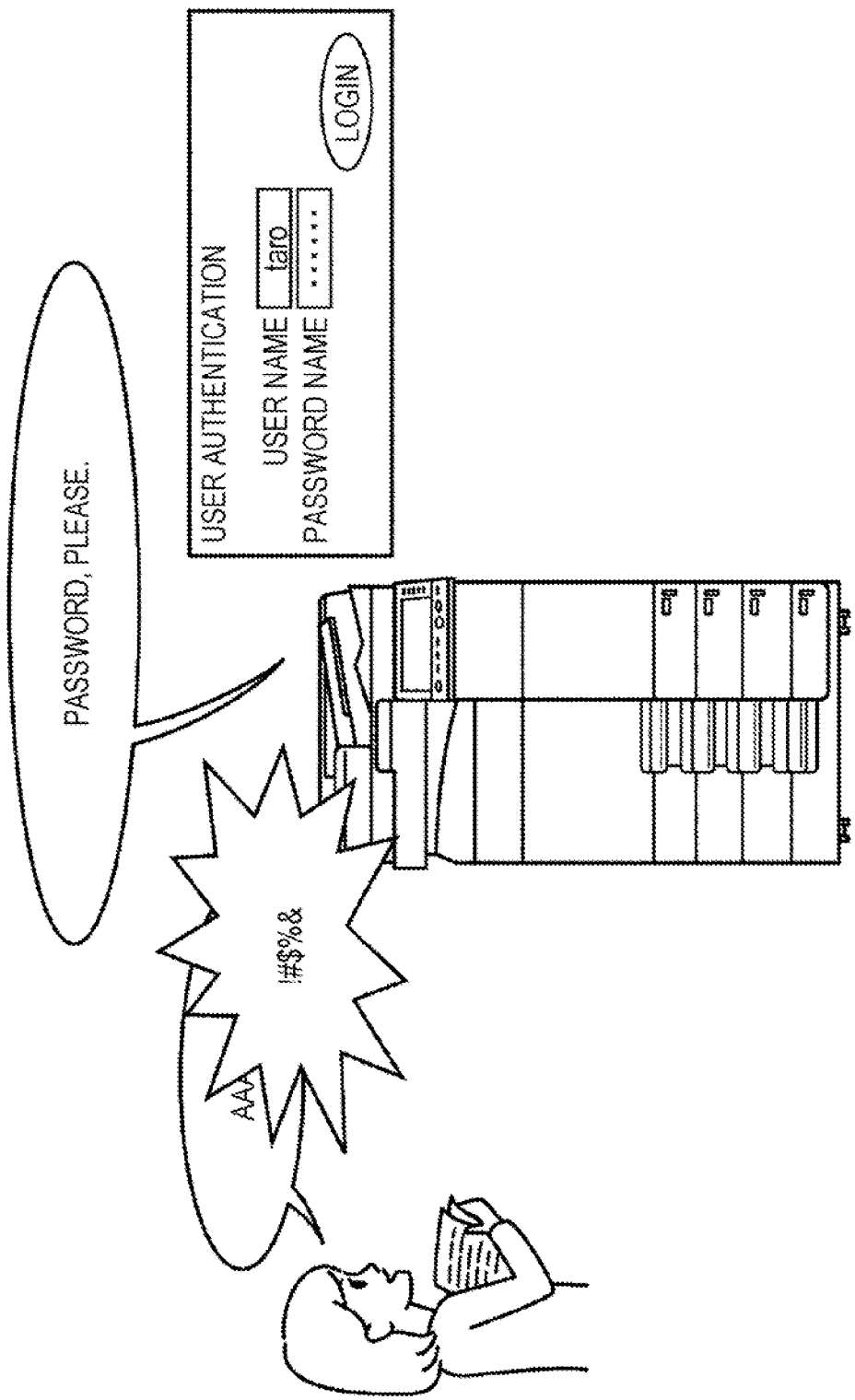
FIG. 6 is a conceptual diagram of a process of setting a predetermined function based on the first embodiment.

FIG. 6 is a conceptual diagram of a process of setting a predetermined function based on the first embodiment.

As illustrated in FIG. 6, the image forming apparatus 1 outputs, as an example, guidance information "Password, please" by voice via the speaker 106 as login authentication.

A user utters a password according to the guidance information from the image forming apparatus 1. At this time, the image forming apparatus 1 outputs a masking signal via the speaker 106 such that the password does not leak.

FIG. 7 is a diagram for explaining a setting table for executing a process of setting a predetermined function based on the first embodiment.

As illustrated in FIG. 7, the storage device 110 stores a setting table 300 in advance.

The setting table 300 includes a plurality of items in advance, and numbers are assigned to the items in advance, respectively. Presence or absence of a confidential flag is associated with each of the items in advance.

In the present embodiment, numbers "1" to "6" are assigned, and guidance information is output according to the numbers in order from the top. Information input by user's voice is set according to the guidance information.

The guidance information output unit 204 outputs guidance information via the speaker 106 corresponding to each of the items of the setting table. The voice reception unit 200 receives a user's voice input from the microphone 108 according to the guidance information. The voice recognition unit 202 recognizes information input by user's voice and outputs the information to the setting unit 206. The setting unit 206 sets the information output from the voice recognition unit 202 to a corresponding item of the setting table.

An input item of the number "1" is "user name". An input example "Yamada" is set. "Absence" is associated for a confidential flag.

An input item of the number "2" is "password". An input example "Abc123" is set. "Presence" is associated for a confidential flag.

An input item of the number "3" is "use function". An input example "Scan and mail sending" is set. "Absence" is associated for a confidential flag.

An input item of the number "4" is "destination". An input example "Suzuki@hoge.com" is associated. "Presence" is associated for a confidential flag.

An input item of the number "5" is "document color". An input example "color" is set. "Absence" is associated for a confidential flag.

An input item of the number "6" is "file format". An input example "PDF" is associated. "Absence" is associated for a confidential flag.

Note that each of the items of the setting table 300 is dynamically changed based on setting contents.

For example, in a case where the file format is "PDF", encryption is not necessary, but in a case where the file format is "encrypted PDF", encryption is necessary. Therefore, in this case, an input item of an encryption key required for encryption is added.

In the first embodiment, the image forming apparatus 1 outputs a masking signal in association with "presence" of a confidential flag.

Figure 8:
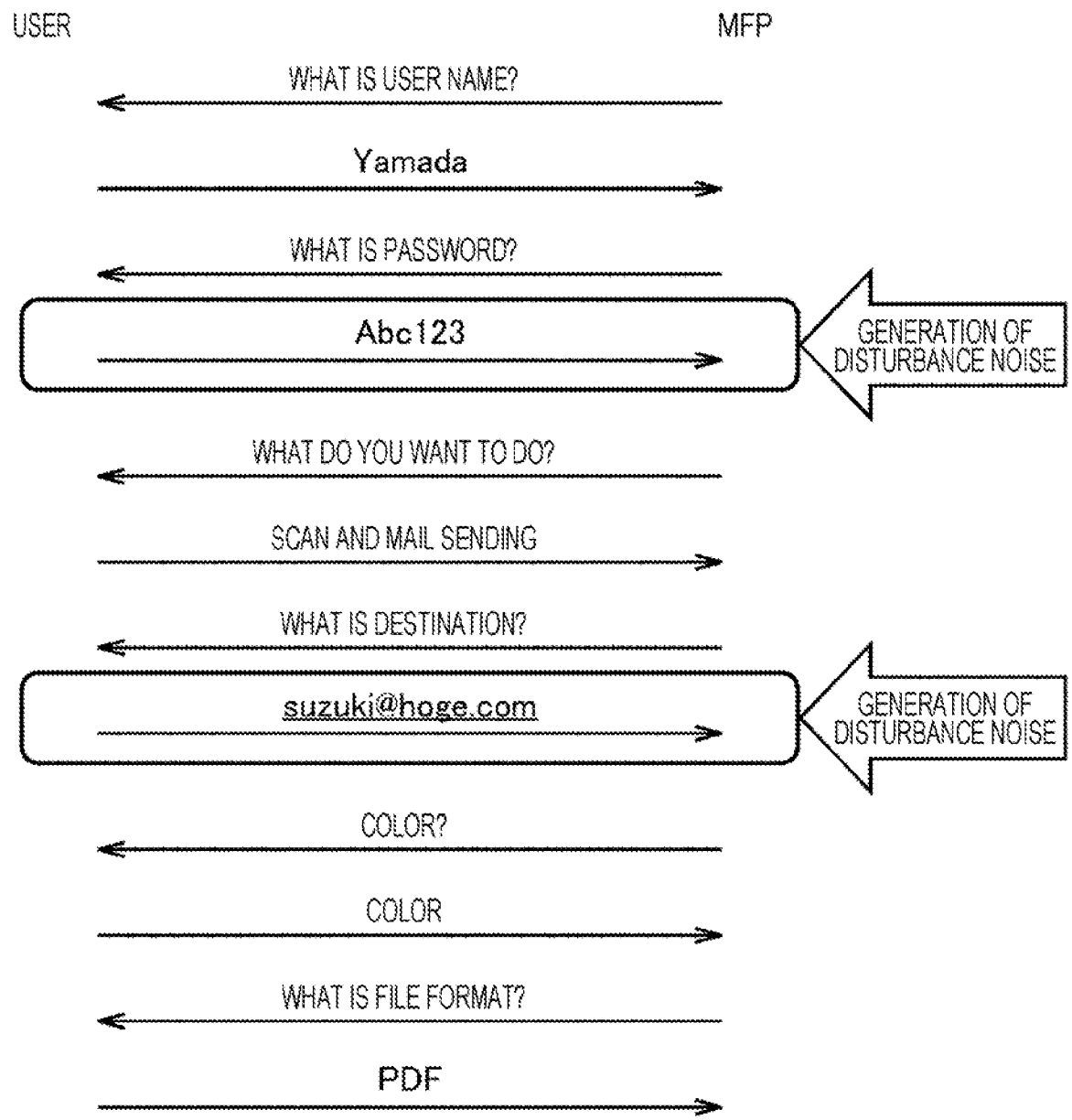
FIG. 8 is a conceptual diagram for explaining a flow of a process of setting a predetermined function of the image forming apparatus according to the first embodiment.

FIG. 8 is a conceptual diagram for explaining a flow of a process of setting a predetermined function of the image forming apparatus 1 according to the first embodiment.

As illustrated in FIG. 8, the guidance information output unit 204 outputs guidance information via the speaker 106 corresponding to each of the items of the setting table 300. For example, the guidance information output unit 204 outputs "What is user name?" via the speaker 106 corresponding to an input item "user name".

A user utters "Yamada" according to the guidance information.

The voice reception unit 200 receives the voice input "Yamada" via the microphone 108 and outputs the voice input "Yamada" to the voice recognition unit 202. The voice recognition unit 202 recognizes information of the voice input "Yamada" and outputs the information to the setting unit 206. The setting unit 206 sets the information in an input example column corresponding to the input item "user name". Note that the confidential flag of the item is "absent". The masking signal output unit 208 does not output a masking signal.

Next, the guidance information output unit 204 outputs "What is password?" via the speaker 106 corresponding to an input item "password" of the setting table 300.

A user utters "Abc123" according to the guidance information.

The voice reception unit 200 receives the voice input "Abc123" via the microphone 108 and outputs the voice input "Abc123" to the voice recognition unit 202. The voice recognition unit 202 recognizes information of the voice input "Abc123" and outputs the information to the setting unit 206. The setting unit 206 sets the information in an input example column corresponding to the input item "password". Note that the confidential flag of the item is "present". The masking signal output unit 208 outputs a masking signal while a user is uttering a word. As a result, it is possible to prevent user's information that should be confidential from being transmitted to another person. For example, the guidance information output unit 204 outputs "What is password?" via the speaker 106, and then outputs a masking signal according to a confidential flag. The guidance information output unit 204 may continuously output a masking signal until the voice recognition unit 202 receives voice input. Alternatively, the voice recognition unit 202 may continuously output a masking signal until the voice recognition unit 202 recognizes voice input.

Next, the guidance information output unit 204 outputs "What do you want to do?" via the speaker 106 corresponding to an input item "use function" of the setting table 300.

A user utters "Scan and mail sending" according to the guidance information.

The voice reception unit 200 receives the voice input "Scan and mail sending" via the microphone 108 and outputs the voice input "Scan and mail sending" to the voice recognition unit 202. The voice recognition unit 202 recognizes information of the voice input "Scan and mail sending" and outputs the information to the setting unit 206. The setting unit 206 sets the information in an input example column corresponding to the input item "use function". Note that the confidential flag of the item is "absent". The masking signal output unit 208 does not output a masking signal.

Next, the guidance information output unit 204 outputs "What is destination?" via the speaker 106 corresponding to an input item "destination" of the setting table 300.

A user utters "Suzuki@hoge.com" according to the guidance information.

The voice reception unit 200 receives the voice input "Suzuki@hoge.com" via the microphone 108 and outputs the voice input "Suzuki@hoge.com" to the voice recognition unit 202. The voice recognition unit 202 recognizes information of the voice input "Suzuki@hoge.com" and outputs the information to the setting unit 206. The setting unit 206 sets the information in an input example column corresponding to the input item "destination". Note that the confidential flag of the item is "present". The masking signal output unit 208 outputs a masking signal while a user is uttering a word. As a result, it is possible to prevent user's information that should be confidential from being transmitted to another person. For example, the guidance information output unit 204 outputs "What is destination?" via the speaker 106, and then outputs a masking signal according to a confidential flag. The guidance information output unit 204 may continuously output a masking signal until the voice recognition unit 202 receives voice input. Alternatively, the voice recognition unit 202 may continuously output a masking signal until the voice recognition unit 202 recognizes voice input.

Next, the guidance information output unit 204 outputs "Color?" via the speaker 106 corresponding to an input item "document color" of the setting table 300.

A user utters "color" according to the guidance information.

The voice reception unit 200 receives the voice input "color" via the microphone 108 and outputs the voice input "color" to the voice recognition unit 202. The voice recognition unit 202 recognizes information of the voice input "color" and outputs the information to the setting unit 206. The setting unit 206 sets the information in an input example column corresponding to the input item "document color". Note that the confidential flag of the item is "absent". The masking signal output unit 208 does not output a masking signal.

Next, the guidance information output unit 204 outputs "What is file format?" via the speaker 106 corresponding to an input item "file format" of the setting table 300.

A user utters "PDF" according to the guidance information.

The voice reception unit 200 receives the voice input "PDF" via the microphone 108 and outputs the voice input "PDF" to the voice recognition unit 202. The voice recognition unit 202 recognizes information of the voice input "PDF" and outputs the information to the setting unit 206. The setting unit 206 sets the information in an input example column corresponding to the input item "file format". Note that the confidential flag of the item is "absent". The masking signal output unit 208 does not output a masking signal.

Figure 9:
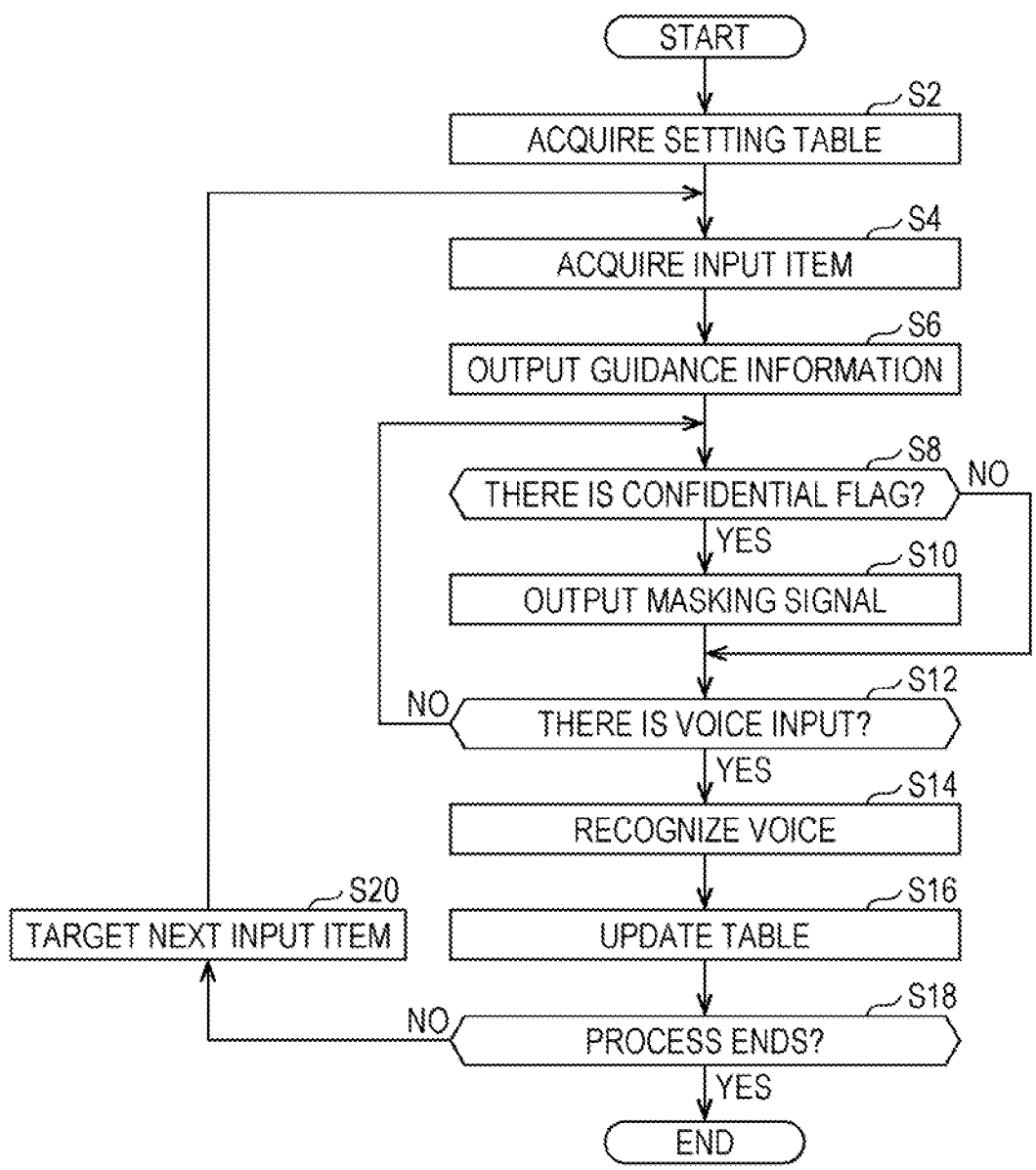
FIG. 9 is a flowchart for explaining a flow of a process of setting a predetermined function of the image forming apparatus according to the first embodiment.

FIG. 9 is a flowchart for explaining a flow of a process of setting a predetermined function of the image forming apparatus 1 according to the first embodiment.

With reference to FIG. 9, the setting unit 206 acquires a setting table stored in the storage device 110 (step S2).

The setting unit 206 acquires an input item with reference to the setting table (step S4).

Next, the setting unit 206 outputs the acquired input item to the guidance information output unit 204. The guidance information output unit 204 outputs guidance information based on the input item output from the setting unit 206 (step S6). Specifically, the guidance information output unit 204 outputs guidance information corresponding to the input item acquired via the speaker 106.

Next, the setting unit 206 determines whether or not there is a confidential flag corresponding to the acquired input item (step S8)

Next, if the setting unit 206 determines that there is a confidential flag (YES in step S8), the setting unit 206 instructs the masking signal output unit 208 to output a masking signal (step S10). As a result, the masking signal output unit 208 outputs a masking signal via the speaker 106.

Meanwhile, in step S8, if the setting unit 206 determines that there is no confidential flag (NO in step S8), the process skips step S10 and proceeds to step S12.

In step S12, the voice reception unit 101 determines whether or not voice input from a user has been received via a microphone (step S12).

In step S12, if the voice reception unit 101 receives voice input from a user via a microphone (YES in step S12), the voice recognition unit 202 recognizes information input by user's voice and outputs the information to the setting unit 206 (step S14).

Meanwhile, in step S12, if the voice reception unit 101 does not receive voice input from a user via a microphone (NO in step S12), the process returns to step S8, and the above processes are repeated.

Next, the setting unit 206 sets (updates) the information output from the voice recognition unit 202 to a corresponding item of a setting table 100 (step S16).

Next, the setting unit 206 determines whether or not the process has ended (step S18).

The setting unit 206 determines whether or not the setting processes for all the items of the setting table have ended. If the setting unit 206 determines that the setting processes for all the items of the setting table have ended (YES in step S18), the process ends (end).

Meanwhile, if the setting unit 206 determines that the setting processes for all the items of the setting table have not ended (NO in step S18), the setting unit 206 targets a next input item (step S20).

Then, the process returns to step S4, and the setting unit 206 acquires the input item (step S4). Subsequent processes are performed similarly.

With the processes, a masking signal is output for an input item to which a confidential flag is associated, and therefore security can be enhanced. In addition, a masking signal is not output all the time, but a masking signal is output for an input item with high confidentiality, and a masking signal is not output for an input item with low confidentiality. Therefore, a period of giving an uncomfortable impression to another person can be shortened. Therefore, it is possible to provide a comfortable environment to another person.

Second Embodiment

In the first embodiment, a method for outputting a masking signal for an input item with high confidentiality and outputting no masking signal for an input item with low confidentiality according to the order of input items of the setting table has been described Meanwhile, by classifying the input items into a group of input items with high confidentiality and a group of input items with low confidentiality, it is possible to put periods of outputting a masking signal together.

Figure 10:
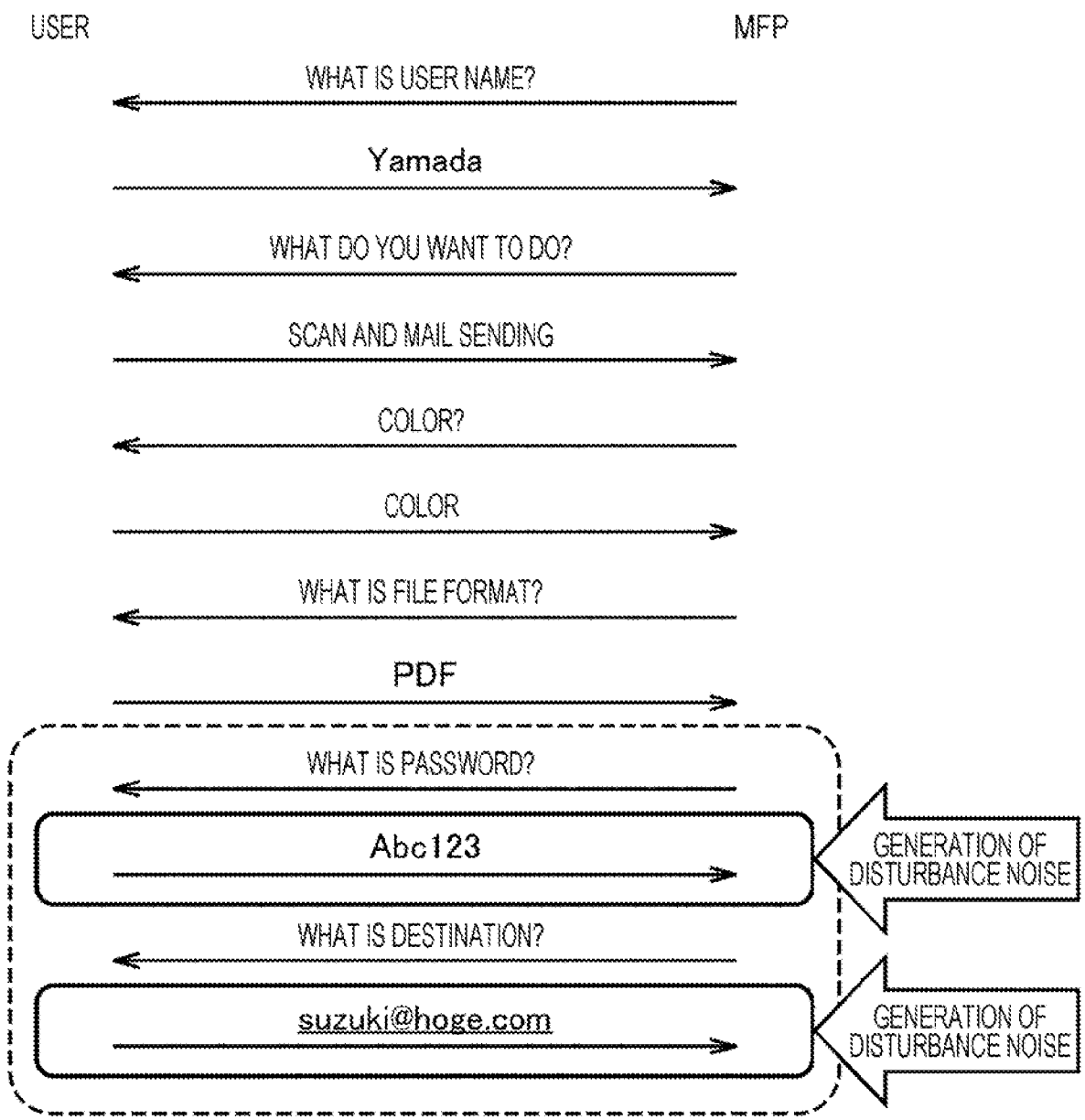
FIG. 10 is a conceptual diagram for explaining a flow of a process of setting a predetermined function of the image forming apparatus according to a second embodiment.

FIG. 10 is a conceptual diagram for explaining a flow of a process of setting a predetermined function of the image forming apparatus 1 according to a second embodiment.

As illustrated in FIG. 10, in the second embodiment, the input items are classified into a group of input items with high confidentiality and a group of input items with low confidentiality. In the present embodiment, the input items are classified into a group of input items with low confidentiality, including "user name", "use function", "document color", and "file format", and a group of input items with high confidentiality, including "password" and "destination".

A case is illustrated in which the group of input items with low confidentiality is set first, and the group of input items with high confidentiality is set later. Note that the group of input items with high confidentiality may be set first, and the group of input items with low confidentiality may be set later.

Specifically, the guidance information output unit 204 outputs guidance information via the speaker 106 corresponding to each of the items of the setting table 300. For example, the guidance information output unit 204 outputs "What is user name?" via the speaker 106 corresponding to an input item "user name".

A user utters "Yamada" according to the guidance information.

The voice reception unit 200 receives the voice input "Yamada" via the microphone 108 and outputs the voice input "Yamada" to the voice recognition unit 202. The voice recognition unit 202 recognizes information of the voice input "Yamada" and outputs the information to the setting unit 206. The setting unit 206 sets the information in an input example column corresponding to the input item "user name". Note that the confidential flag of the item is "absent". The masking signal output unit 208 does not output a masking signal.

Next, the guidance information output unit 204 outputs "What do you want to do?" via the speaker 106 corresponding to an input item "use function" of the setting table 300.

A user utters "Scan and mail sending" according to the guidance information.

The voice reception unit 200 receives the voice input "Scan and mail sending" via the microphone 108 and outputs the voice input "Scan and mail sending" to the voice recognition unit 202. The voice recognition unit 202 recognizes information of the voice input "Scan and mail sending" and outputs the information to the setting unit 206. The setting unit 206 sets the information in an input example column corresponding to the input item "use function". Note that the confidential flag of the item is "absent". The masking signal output unit 208 does not output a masking signal.

Next, the guidance information output unit 204 outputs "Color?" via the speaker 106 corresponding to an input item "document color" of the setting table 300.

A user utters "color" according to the guidance information.

The voice reception unit 200 receives the voice input "color" via the microphone 108 and outputs the voice input "color" to the voice recognition unit 202. The voice recognition unit 202 recognizes information of the voice input "color" and outputs the information to the setting unit 206. The setting unit 206 sets the information in an input example column corresponding to the input item "document color". Note that the confidential flag of the item is "absent". The masking signal output unit 208 does not output a masking signal.

Next, the guidance information output unit 204 outputs "What is file format?" via the speaker 106 corresponding to an input item "file format" of the setting table 300.

A user utters "PDF" according to the guidance information.

The voice reception unit 200 receives the voice input "PDF" via the microphone 108 and outputs the voice input "PDF" to the voice recognition unit 202. The voice recognition unit 202 recognizes information of the voice input "PDF" and outputs the information to the setting unit 206. The setting unit 206 sets the information in an input example column corresponding to the input item "file format". Note that the confidential flag of the item is "absent". The masking signal output unit 208 does not output a masking signal.

Next, the guidance information output unit 204 outputs "What is password?" via the speaker 106 corresponding to an input item "password" of the setting table 300.

A user utters "Abc123" according to the guidance information.

The voice reception unit 200 receives the voice input "Abc123" via the microphone 108 and outputs the voice input "Abc123" to the voice recognition unit 202. The voice recognition unit 202 recognizes information of the voice input "Abc123" and outputs the information to the setting unit 206. The setting unit 206 sets the information in an input example column corresponding to the input item "password". Note that the confidential flag of the item is "present". The masking signal output unit 208 outputs a masking signal while a user is uttering a word. As a result, it is possible to prevent user's information that should be confidential from being transmitted to another person. For example, the guidance information output unit 204 outputs "What is password?" via the speaker 106, and then outputs a masking signal according to a confidential flag. The guidance information output unit 204 may continuously output a masking signal until the voice recognition unit 202 receives voice input. Alternatively, the voice recognition unit 202 may continuously output a masking signal until the voice recognition unit 202 recognizes voice input.

Next, the guidance information output unit 204 outputs "What is destination?" via the speaker 106 corresponding to an input item "destination" of the setting table 300.

A user utters "Suzuki@hoge.com" according to the guidance information.

The voice reception unit 200 receives the voice input "Suzuki@hoge.com" via the microphone 108 and outputs the voice input "Suzuki@hoge.com" to the voice recognition unit 202. The voice recognition unit 202 recognizes information of the voice input "Suzuki@hoge.com" and outputs the information to the setting unit 206. The setting unit 206 sets the information in an input example column corresponding to the input item "destination". Note that the confidential flag of the item is "present". The masking signal output unit 208 outputs a masking signal while a user is uttering a word. As a result, it is possible to prevent user's information that should be confidential from being transmitted to another person. For example, the guidance information output unit 204 outputs "What is destination?" via the speaker 106, and then outputs a masking signal according to a confidential flag. The guidance information output unit 204 may continuously output a masking signal until the voice recognition unit 202 receives voice input. Alternatively, the voice recognition unit 202 may continuously output a masking signal until the voice recognition unit 202 recognizes voice input.

According to this method, it is possible to put periods of outputting a masking signal together. Therefore, a period of giving an uncomfortable impression to another person can be shortened. Therefore, it is possible to provide a comfortable environment to another person.

FIG. 11 is a diagram for explaining a setting table 302 for executing a process of setting a predetermined function based on the second embodiment.

As illustrated in FIG. 11, the storage device 110 stores the setting table 302 in advance.

The setting table 302 includes a plurality of items in advance, and guidance information is output according to the numbers in order from the top. Information input by user's voice is set according to the guidance information.

As compared with the setting table of FIG. 7, an item with low confidentiality is set at the top of the table, and an item with high confidentiality is set at the bottom of the table.

Specifically, the table is set in the order of the input item numbers "1", "3", "5", "6", "2", and "4".

Figure 12:
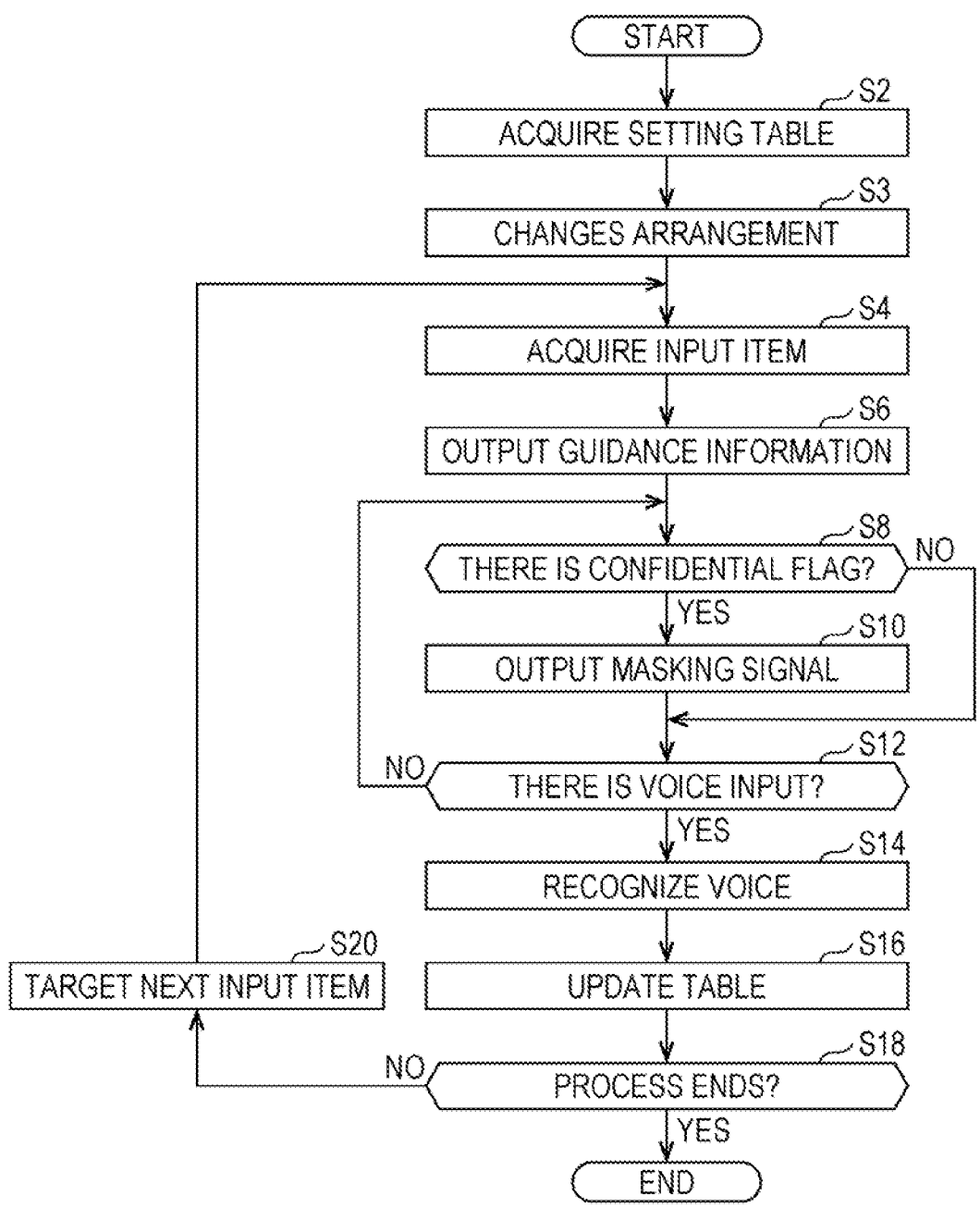
FIG. 12 is a flowchart for explaining a flow of a process of setting a predetermined function of the image forming apparatus according to the second embodiment.

FIG. 12 is a flowchart for explaining a flow of a process of setting a predetermined function of the image forming apparatus 1 according to the second embodiment.

With reference to FIG. 12, the setting unit 206 acquires a setting table stored in the storage device 110 (step S2).

Next, the setting unit 206 changes the arrangement of the setting table (step S3).

Specifically, as described with reference to FIG. 11, a case is illustrated in which the setting unit 206 sets the group of input items with low confidentiality first, and sets the group of input items with high confidentiality later. Note that the group of input items with high confidentiality may be set first, and the group of input items with low confidentiality may be set later. Note that whether or not an input item is highly confidential can be determined by presence or absence of a confidential flag.

Next, the setting unit 206 acquires an input item with reference to the setting table (step S4). Subsequent processes are similar to those described with reference to FIG. 9, and therefore detailed description thereof will not be repeated.

According to this method, it is possible to put periods of outputting a masking signal together. Therefore, a period of giving an uncomfortable impression to another person can be shortened. Therefore, it is possible to provide a comfortable environment to another person.

Third Embodiment

In the first and second embodiments, the case has been described in which a masking signal is output for an input item with high confidentiality. Meanwhile, in a situation in which there is only one user, it is not necessary to output a masking signal.

In the third embodiment, a case where a masking signal is output in consideration of surrounding environmental information will be described.

Figure 13:
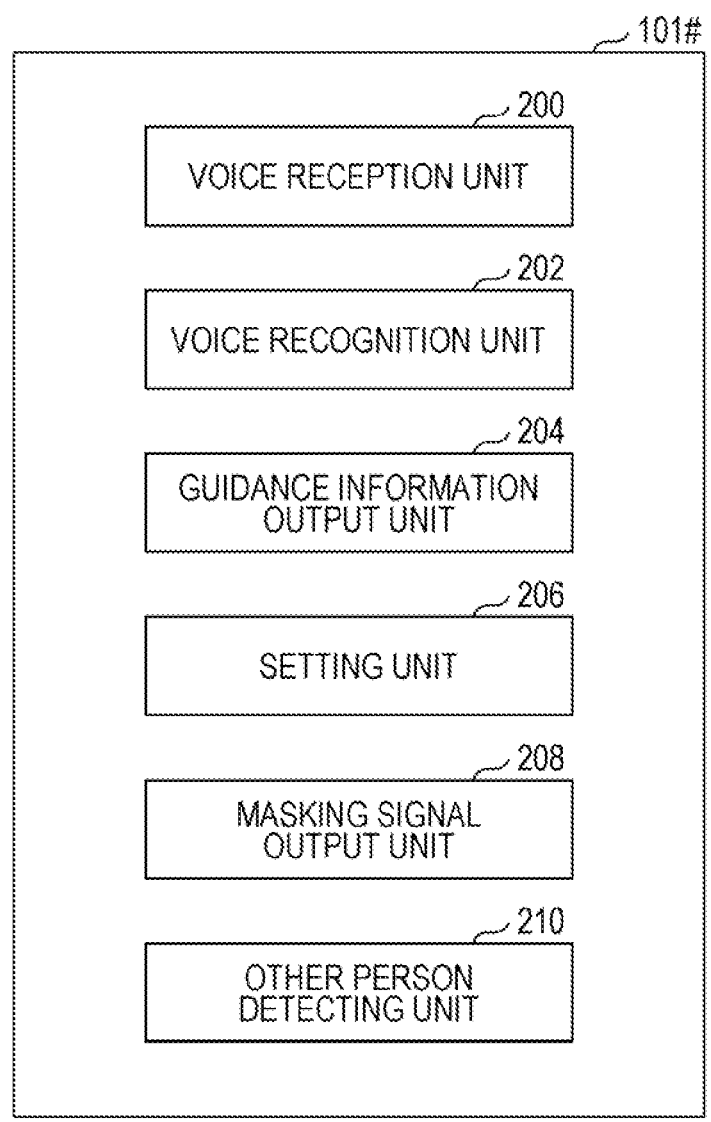
FIG. 13 is a diagram for explaining a functional block of a control device according to a third embodiment.

FIG. 13 is a diagram for explaining a functional block of a control device 101# according to the third embodiment.

With reference to FIG. 13, the control device 101# is different from the control device 101 in the functional block diagram described in FIG. 5 in that an other person detecting unit 210 is added.

Other components are similar to those described with reference to FIG. 5, and therefore detailed description thereof will not be repeated.

The other person detecting unit 210 determines whether or not there is a person other than a user based on voice information input via the microphone 108. For example, it is possible to determine whether the person is a user or a person other than the user by identifying the intensity of a voice signal in a predetermined band received by the microphone 108. For example, in a case where a low-intensity voice signal is input, it may be determined that there is another person.

In the third embodiment, in a case where the other person detecting unit 210 determines that there is another person, a masking signal is output. In a case where the other person detecting unit 210 determines that there is no other person, a masking signal is not output.

Figure 14:
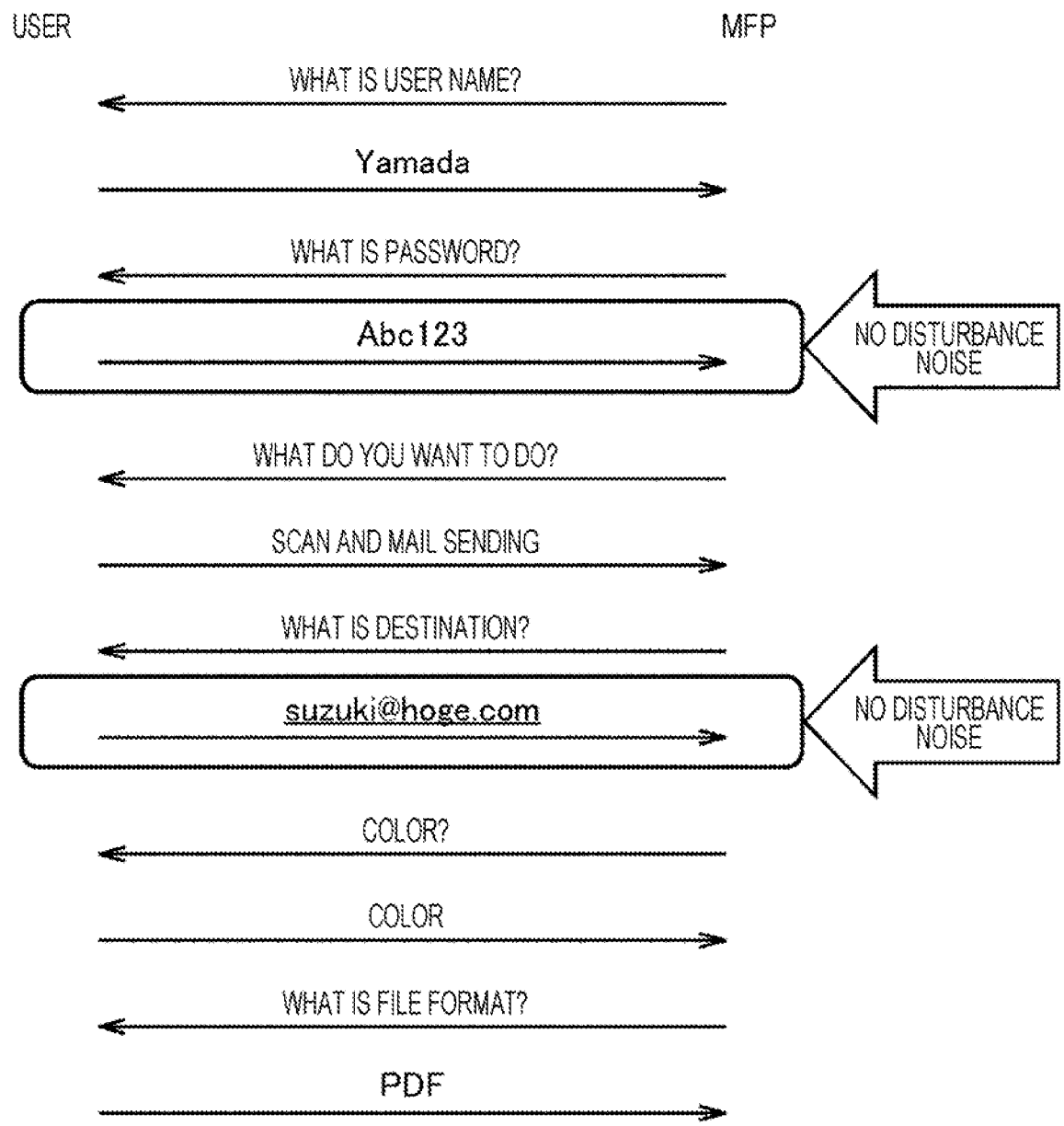
FIG. 14 is a conceptual diagram for explaining a flow of a process of setting a predetermined function of the image forming apparatus according to a third embodiment.

FIG. 14 is a conceptual diagram for explaining a flow of a process of setting a predetermined function of the image forming apparatus 1 according to the third embodiment. In the present embodiment, a case where there is no person than a user will be described.

As illustrated in FIG. 14, the guidance information output unit 204 outputs guidance information via the speaker 106 corresponding to each of the items of the setting table 300. For example, the guidance information output unit 204 outputs "What is user name?" via the speaker 106 corresponding to an input item "user name".

As compared with the method of FIG. 8, the guidance information output unit 204 outputs "What is password?" via the speaker 106 corresponding to an input item "password" of the setting table 300. A user utters "Abc123" according to the guidance information.

At this time, in the first embodiment, the masking signal output unit 208 outputs a masking signal while a user is uttering a word.

Meanwhile, in the third embodiment, in a case where the other person detecting unit 210 determines that there is no other person, a masking signal is not output. The other processes are similar.

Figure 15:
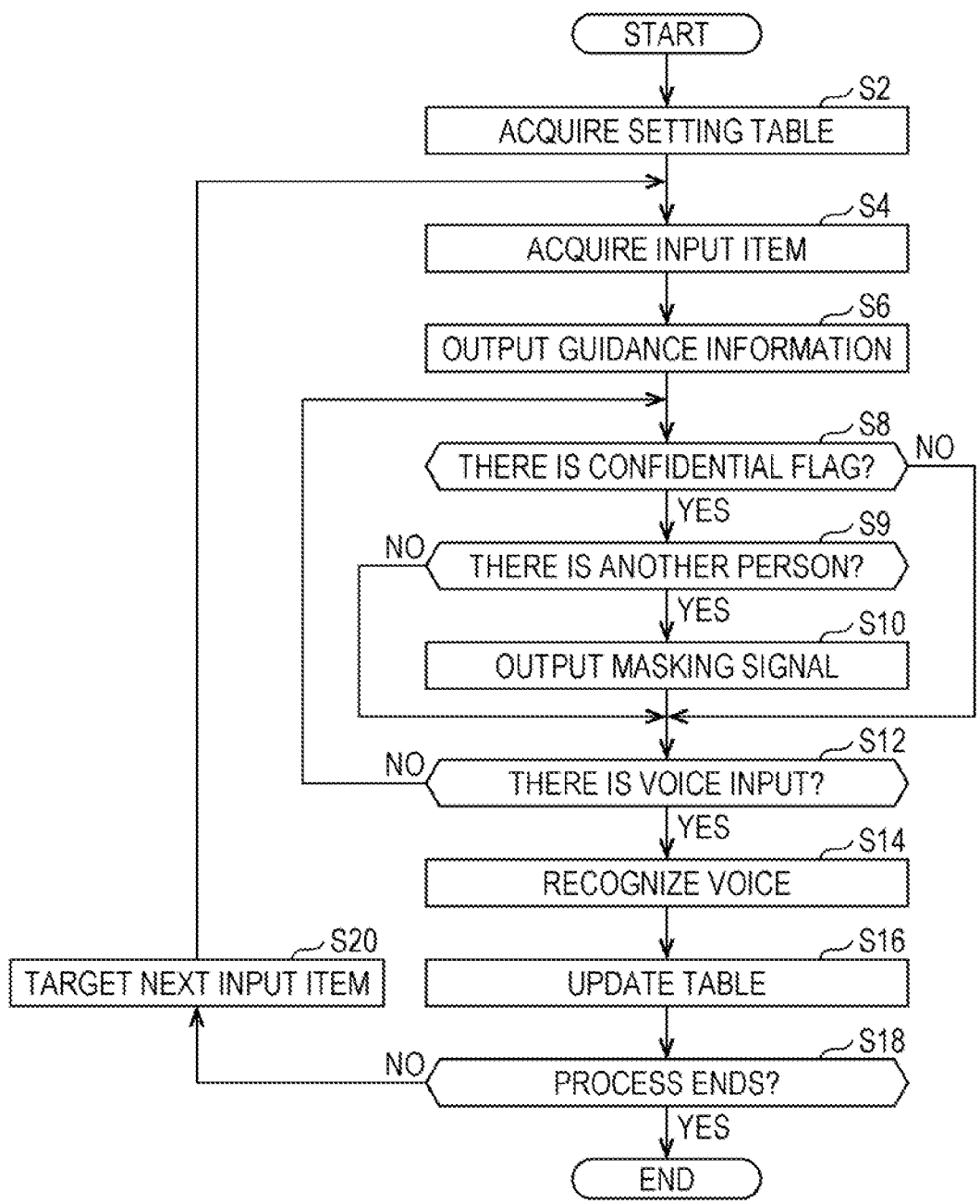
FIG. 15 is a flowchart for explaining a flow of a process of setting a predetermined function of the image forming apparatus according to the third embodiment.

FIG. 15 is a flowchart for explaining a flow of a process of setting a predetermined function of the image forming apparatus 1 according to the third embodiment.

With reference to FIG. 15, as compared with the flowchart of FIG. 9, in step S8, if the setting unit 206 determines that there is a confidential flag (YES in step S8), the setting unit 206 determines whether or not there is another person (step S9). Specifically, the setting unit 206 determines whether or not notification of detecting another person has been received from the other person detecting unit 210.

In step S9, if it is determined that there is another person (YES in step S9), the setting unit 206 instructs the masking signal output unit 208 to output a masking signal (step S10). As a result, the masking signal output unit 208 outputs a masking signal via the speaker 106.

Meanwhile, in step S9, if the setting unit 206 determines that there is no other person (NO in step S9), the process skips step S10 and proceeds to step S12.

Subsequent processes are similar, and therefore detailed description thereof will not be repeated.

With the processes, it is possible to determine whether or not a masking signal should be output due to presence of another person, and not to output a masking signal in a case where there is no other person. This makes it possible to suppress an unnecessary operation and to reduce power consumption. In addition, it is possible to provide a comfortable environment to another person.

Fourth Embodiment

In the above embodiment, the method for performing setting in the setting table based on the contents uttered by a user has been described.

Meanwhile, a user may utter a condition whose setting is prohibited.

As a result, it may be necessary to change previously input setting contents.

FIG. 16 is a diagram for explaining a setting table 304 for executing a process of setting a predetermined function based on the fourth embodiment.

As illustrated in FIG. 16, the setting table 304 is different from the setting table 302 in that the file format is changed from "PDF" to "encrypted PDF" and an input item "encryption key" is newly added.

A setting unit 206 according to the fourth embodiment executes a process of determining validity of the input item in addition to setting of the setting table 304.

In a case where the input item is valid, a process of inputting a next input item is executed. Meanwhile, in a case where the input item is not valid (invalid), a process of inputting a previous input item is executed again so as to make the input item valid.

In the present embodiment, a case is illustrated in which a process of setting an input item "file format" is executed again, "PDF" is changed to "encrypted PDF", and resetting is performed.

FIG. 17 is a diagram for explaining a table indicating a prohibition condition according to the fourth embodiment.

As illustrated in FIG. 17, a relationship between the destination of a mail and the file format (PDF) is illustrated.

Specifically, in the table, in a case where the destination of a mail is inside a company, either an encrypted PDF file format or an unencrypted normal PDF file format can be selected.

Meanwhile, in a case where the destination of a mail is outside a company, only an encrypted PDF file format can be selected, and an unencrypted normal PDF file format cannot be selected.

Therefore, in a case where the destination of a mail is outside a company and normal PDF is selected as a file format, a process of changing the setting contents is required.

Whether the destination is outside or inside a company may be determined by identifying an address after the sign "@".

Figure 18:
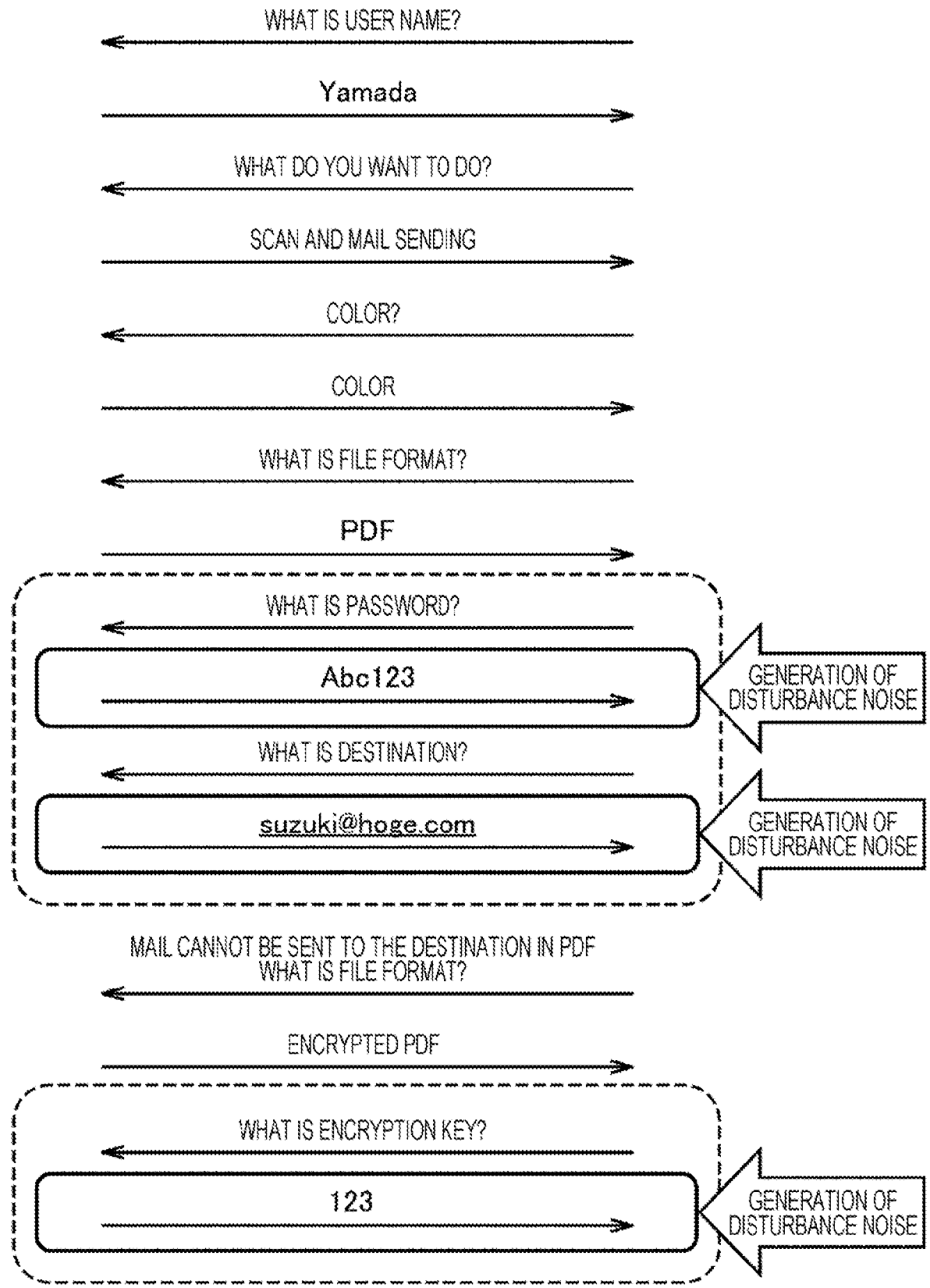
FIG. 18 is a conceptual diagram for explaining a flow of a process of setting a predetermined function of the image forming apparatus according to the fourth embodiment.

FIG. 18 is a conceptual diagram for explaining a flow of a process of setting a predetermined function of the image forming apparatus 1 according to the fourth embodiment.

As illustrated in FIG. 18, in the fourth embodiment, the input items are classified into a group of input items with high confidentiality and a group of input items with low confidentiality. In the present embodiment, the input items are classified into a group of input items with low confidentiality, including "user name", "use function", "document color", and "file format", and a group of input items with high confidentiality, including "password" and "destination".

A case is illustrated in which the group of input items with low confidentiality is set first, and the group of input items with high confidentiality is set later. Note that the group of input items with high confidentiality may be set first, and the group of input items with low confidentiality may be set later.

Specifically, the guidance information output unit 204 outputs guidance information via the speaker 106 corresponding to each of the items of the setting table 300. For example, the guidance information output unit 204 outputs "What is user name?" via the speaker 106 corresponding to an input item "user name".

A user utters "Yamada" according to the guidance information.

The voice reception unit 200 receives the voice input "Yamada" via the microphone 108 and outputs the voice input "Yamada" to the voice recognition unit 202. The voice recognition unit 202 recognizes information of the voice input "Yamada" and outputs the information to the setting unit 206. The setting unit 206 sets the information in an input example column corresponding to the input item "user name". Note that the confidential flag of the item is "absent". The masking signal output unit 208 does not output a masking signal.

Next, the guidance information output unit 204 outputs "What do you want to do?" via the speaker 106 corresponding to an input item "use function" of the setting table 300.

A user utters "Scan and mail sending" according to the guidance information.

The voice reception unit 200 receives the voice input "Scan and mail sending" via the microphone 108 and outputs the voice input "Scan and mail sending" to the voice recognition unit 202. The voice recognition unit 202 recognizes information of the voice input "Scan and mail sending" and outputs the information to the setting unit 206. The setting unit 206 sets the information in an input example column corresponding to the input item "use function". Note that the confidential flag of the item is "absent". The masking signal output unit 208 does not output a masking signal.

Next, the guidance information output unit 204 outputs "Color?" via the speaker 106 corresponding to an input item "document color" of the setting table 300.

A user utters "color" according to the guidance information.

The voice reception unit 200 receives the voice input "color" via the microphone 108 and outputs the voice input "color" to the voice recognition unit 202. The voice recognition unit 202 recognizes information of the voice input "color" and outputs the information to the setting unit 206. The setting unit 206 sets the information in an input example column corresponding to the input item "document color". Note that the confidential flag of the item is "absent". The masking signal output unit 208 does not output a masking signal.

Next, the guidance information output unit 204 outputs "What is file format?" via the speaker 106 corresponding to an input item "file format" of the setting table 300.

A user utters "PDF" according to the guidance information.

The voice reception unit 200 receives the voice input "PDF" via the microphone 108 and outputs the voice input "PDF" to the voice recognition unit 202. The voice recognition unit 202 recognizes information of the voice input "PDF" and outputs the information to the setting unit 206. The setting unit 206 sets the information in an input example column corresponding to the input item "file format". Note that the confidential flag of the item is "absent". The masking signal output unit 208 does not output a masking signal.

Next, the guidance information output unit 204 outputs "What is password?" via the speaker 106 corresponding to an input item "password" of the setting table 300.

A user utters "Abc123" according to the guidance information.

The voice reception unit 200 receives the voice input "Abc123" via the microphone 108 and outputs the voice input "Abc123" to the voice recognition unit 202. The voice recognition unit 202 recognizes information of the voice input "Abc123" and outputs the information to the setting unit 206. The setting unit 206 sets the information in an input example column corresponding to the input item "password". Note that the confidential flag of the item is "present". The masking signal output unit 208 outputs a masking signal while a user is uttering a word. As a result, it is possible to prevent user's information that should be confidential from being transmitted to another person. For example, the guidance information output unit 204 outputs "What is password?" via the speaker 106, and then outputs a masking signal according to a confidential flag. The guidance information output unit 204 may continuously output a masking signal until the voice recognition unit 202 receives voice input. Alternatively, the voice recognition unit 202 may continuously output a masking signal until the voice recognition unit 202 recognizes voice input.

Next, the guidance information output unit 204 outputs "What is destination?" via the speaker 106 corresponding to an input item "destination" of the setting table 300.

A user utters "Suzuki@hoge.com" according to the guidance information.

The voice reception unit 200 receives the voice input "Suzuki@hoge.com" via the microphone 108 and outputs the voice input "Suzuki@hoge.com" to the voice recognition unit 202. The voice recognition unit 202 recognizes information of the voice input "Suzuki@hoge.com" and outputs the information to the setting unit 206. The setting unit 206 sets the information in an input example column corresponding to the input item "destination". Note that the confidential flag of the item is "present". The masking signal output unit 208 outputs a masking signal while a user is uttering a word. As a result, it is possible to prevent user's information that should be confidential from being transmitted to another person. For example, the guidance information output unit 204 outputs "What is destination?" via the speaker 106, and then outputs a masking signal according to a confidential flag. The guidance information output unit 204 may continuously output a masking signal until the voice recognition unit 202 receives voice input. Alternatively, the voice recognition unit 202 may continuously output a masking signal until the voice recognition unit 202 recognizes voice input.

Here, a case where "Suzuki@hoge.com" set as "destination" is outside a company will be described.

The setting unit 206 determines that a file format "PDF" cannot be set based on the table indicating a prohibition condition described in FIG. 16.

The setting unit 206 extracts a setting to be changed and outputs the setting to the guidance information output unit 204. The guidance information output unit 204 outputs "A mail cannot be sent to the destination in PDF. What is the file format?" via the speaker 106.

A user utters "encrypted PDF" according to the guidance information.

The voice reception unit 200 receives the voice input "encrypted PDF" via the microphone 108 and outputs the voice input "encrypted PDF" to the voice recognition unit 202. The voice recognition unit 202 recognizes information of the voice input "encrypted PDF" and outputs the information to the setting unit 206. The setting unit 206 updates information in an input example column corresponding to the input item "file format". Specifically, "PDF" is updated to "encrypted PDF". In a case where the file format is "encrypted PDF", the setting unit 206 adds an input item of an encryption key required for encryption to the setting table.

The guidance information output unit 204 outputs "What is encryption key?" via the speaker 106 corresponding to the input item "encryption key" of the setting table 300.

A user utters "123" according to the guidance information.

The voice reception unit 200 receives the voice input "123" via the microphone 108 and outputs the voice input "123" to the voice recognition unit 202. The voice recognition unit 202 recognizes information of the voice input "123" and outputs the information to the setting unit 206. The setting unit 206 sets the information in an input example column corresponding to the input item "encryption key". Note that the confidential flag of the item is "present". The masking signal output unit 208 outputs a masking signal while a user is uttering a word. As a result, it is possible to prevent user's information that should be confidential from being transmitted to another person. For example, the guidance information output unit 204 outputs "What is destination?" via the speaker 106, and then outputs a masking signal according to a confidential flag. The guidance information output unit 204 may continuously output a masking signal until the voice recognition unit 202 receives voice input. Alternatively, the voice recognition unit 202 may continuously output a masking signal until the voice recognition unit 202 recognizes voice input.

Figure 19:
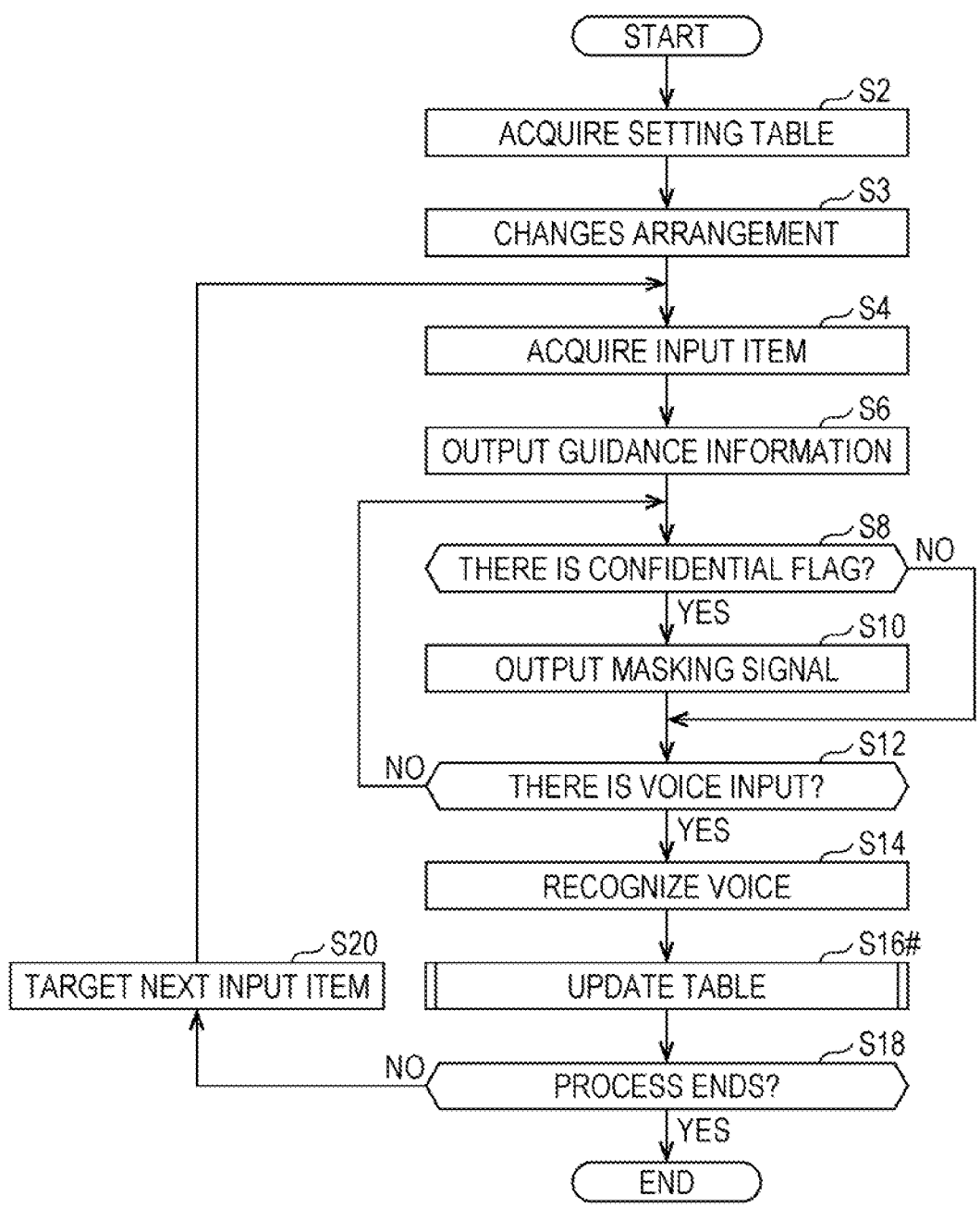
FIG. 19 is a flowchart for explaining a flow of a process of setting a predetermined function of the image forming apparatus according to the fourth embodiment.

FIG. 19 is a flowchart for explaining a flow of a process of setting a predetermined function of the image forming apparatus 1 according to the fourth embodiment.

With reference to FIG. 19, the flow of FIG. 19 is different from the flow of FIG. 12 in that step S16 is replaced with step S16#. Since other points are similar, detailed description thereof will not be repeated.

Figure 20:
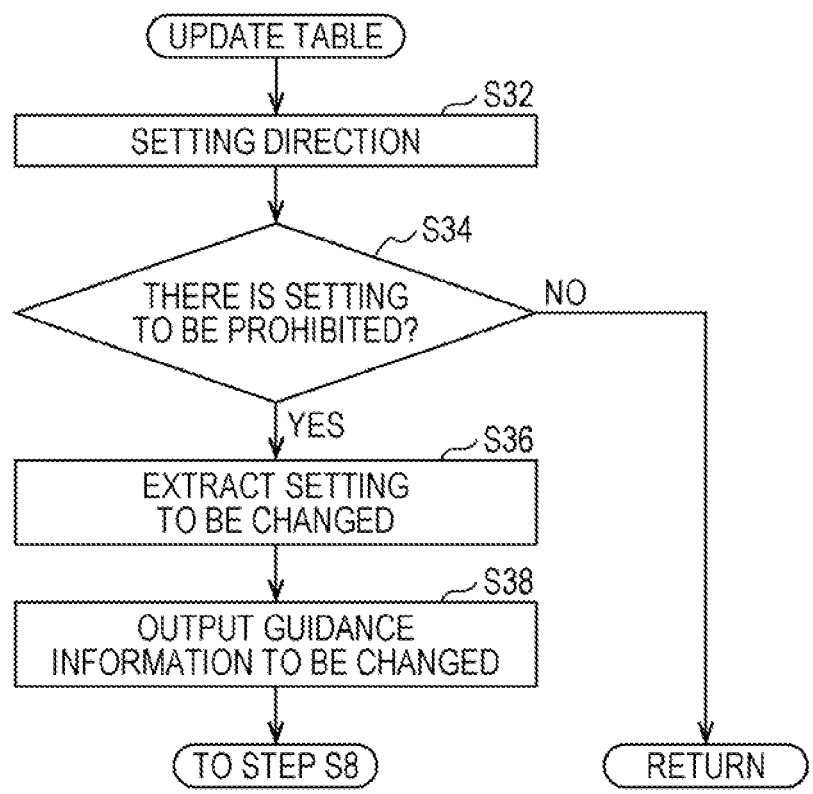
FIG. 20 is a flowchart of a subroutine for explaining updating a table according to the fourth embodiment.

FIG. 20 is a flowchart of a subroutine for explaining updating a table according to the fourth embodiment.

With reference to FIG. 20, the setting unit 206 sets a corresponding input item of the setting table based on the contents recognized by the voice recognition unit 202 (step S32).

Next, the setting unit 206 determines whether or not there is a setting to be prohibited (step S34).

In step S34, if the setting unit 206 determines that there is no setting to be prohibited (NO in step S34), the process ends (return).

In the fourth embodiment, the setting unit 206 determines whether or not there is a setting to be prohibited based on a table indicating a prohibition condition, as described with reference to FIG. 16.

The setting unit 206 determines whether or not the destination of a mail is outside a company in a file format of "PDF", and determines that there is a setting to be prohibited if the condition is satisfied.

In step S34, if the setting unit 206 determines that there is a setting to be prohibited (YES in step S34), the setting unit 206 extracts a setting to be changed (step S36).

Specifically, the setting unit 206 extracts an input item in a file format as a setting to be changed. The setting unit 206 outputs an input item to be changed to the guidance information output unit 204.

The guidance information output unit 204 outputs guidance information to be changed based on the input item output from the setting unit 206.

Then, the process proceeds to step S8 in FIG. 19.

The subsequent processes are similar to those described above.

With reference to FIG. 20, the setting unit 206 determines whether or not there is a confidential flag corresponding to the acquired input item (step S8).

Next, if the setting unit 206 determines that there is a confidential flag (YES in step S8), the setting unit 206 instructs the masking signal output unit 208 to output a masking signal (step S10). As a result, the masking signal output unit 208 outputs a masking signal via the speaker 106.

Meanwhile, in step S8, if the setting unit 206 determines that there is no confidential flag (NO in step S8), the process skips step S10 and proceeds to step S12.

In step S12, the voice reception unit 101 determines whether or not voice input from a user has been received via a microphone (step S12).

In step S12, if the voice reception unit 101 receives voice input from a user via a microphone (YES in step S12), the voice recognition unit 202 recognizes information input by user's voice and outputs the information to the setting unit 206 (step S14).

Meanwhile, in step S12, if the voice reception unit 101 does not receive voice input from a user via a microphone (NO in step S12), the process returns to step S8, and the above processes are repeated.

Next, the setting unit 206 sets (updates) the information output from the voice recognition unit 202 to a corresponding item of the setting table 100 (step S16#).

The processes are repeated until there is no longer any setting to be prohibited.

With the processes, even in a case where a user utters a condition for which setting is prohibited, it is possible to appropriately change previously input setting contents and to perform resetting.

Fifth Embodiment

In the above embodiment, the case where a masking signal is output in a case where there is a confidential flag corresponding to an input item has been described. Meanwhile, a user may utter information with high confidentiality at a timing intended by the user. In this case, in a case where a masking signal is not output, information may leak.

In the fifth embodiment, a method for outputting a masking signal in a case where a user utters information with high confidentiality will be described.

Figure 21:
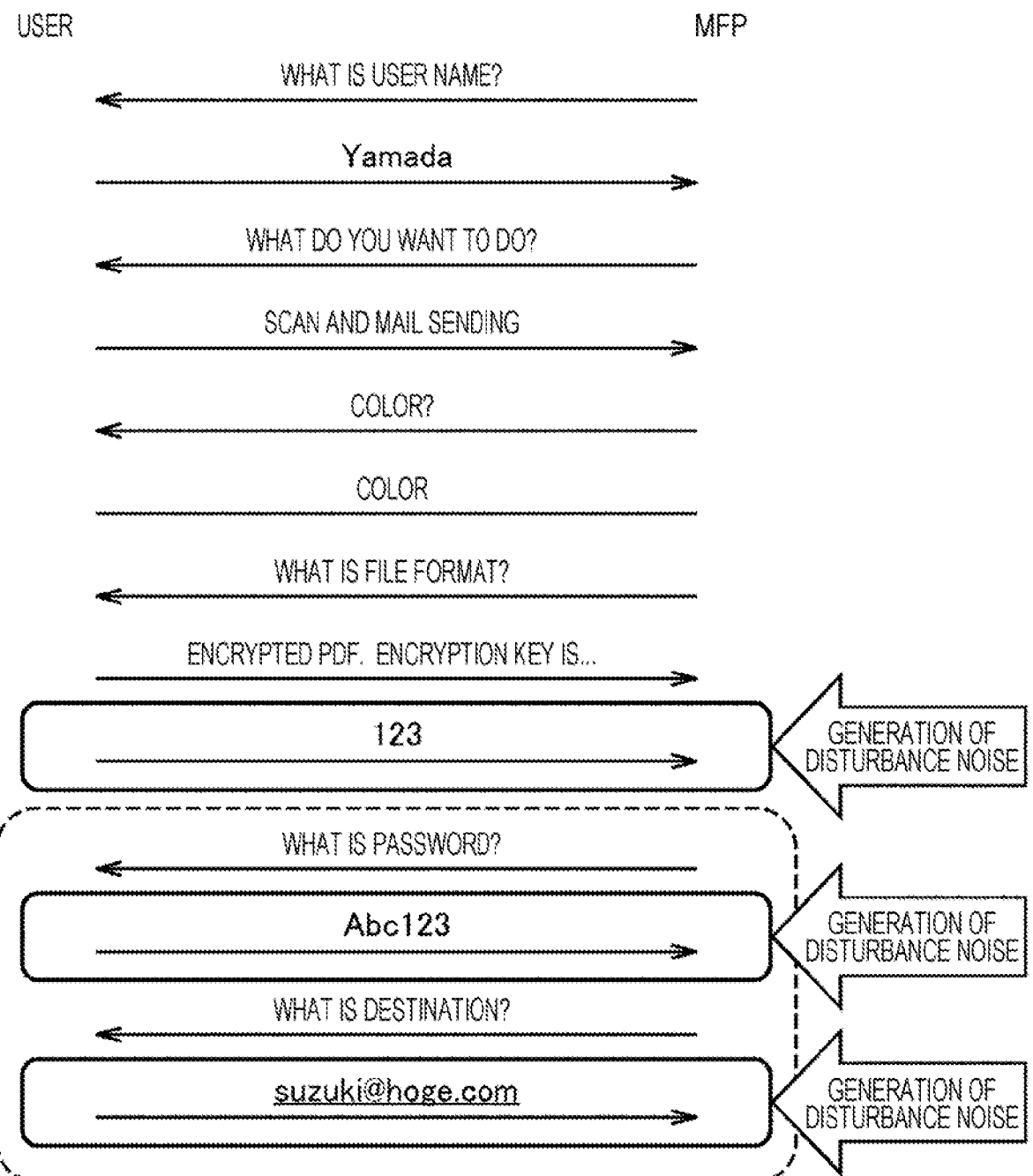
FIG. 21 is a conceptual diagram for explaining a flow of a process of setting a predetermined function of the image forming apparatus according to a fifth embodiment.

FIG. 21 is a conceptual diagram for explaining a flow of a process of setting a predetermined function of the image forming apparatus 1 according to the fifth embodiment.

As illustrated in FIG. 21, in the fifth embodiment, the input items are classified into a group of input items with high confidentiality and a group of input items with low confidentiality. In the present embodiment, the input items are classified into a group of input items with low confidentiality, including "user name", "use function", "document color", and "file format", and a group of input items with high confidentiality, including "password" and "destination".

A case is illustrated in which the group of input items with low confidentiality is set first, and the group of input items with high confidentiality is set later. Note that the group of input items with high confidentiality may be set first, and the group of input items with low confidentiality may be set later.

Specifically, the guidance information output unit 204 outputs guidance information via the speaker 106 corresponding to each of the items of the setting table 300. For example, the guidance information output unit 204 outputs "What is user name?" via the speaker 106 corresponding to an input item "user name".

A user utters "Yamada" according to the guidance information.

The voice reception unit 200 receives the voice input "Yamada" via the microphone 108 and outputs the voice input "Yamada" to the voice recognition unit 202. The voice recognition unit 202 recognizes information of the voice input "Yamada" and outputs the information to the setting unit 206. The setting unit 206 sets the information in an input example column corresponding to the input item "user name". Note that the confidential flag of the item is "absent". The masking signal output unit 208 does not output a masking signal.

Next, the guidance information output unit 204 outputs "What do you want to do?" via the speaker 106 corresponding to an input item "use function" of the setting table 300.

A user utters "Scan and mail sending" according to the guidance information.

The voice reception unit 200 receives the voice input "Scan and mail sending" via the microphone 108 and outputs the voice input "Scan and mail sending" to the voice recognition unit 202. The voice recognition unit 202 recognizes information of the voice input "Scan and mail sending" and outputs the information to the setting unit 206. The setting unit 206 sets the information in an input example column corresponding to the input item "use function". Note that the confidential flag of the item is "absent". The masking signal output unit 208 does not output a masking signal.

Next, the guidance information output unit 204 outputs "Color?" via the speaker 106 corresponding to an input item "document color" of the setting table 300.

A user utters "color" according to the guidance information.

The voice reception unit 200 receives the voice input "color" via the microphone 108 and outputs the voice input "color" to the voice recognition unit 202. The voice recognition unit 202 recognizes information of the voice input "color" and outputs the information to the setting unit 206. The setting unit 206 sets the information in an input example column corresponding to the input item "document color". Note that the confidential flag of the item is "absent". The masking signal output unit 208 does not output a masking signal.

Next, the guidance information output unit 204 outputs "What is file format?" via the speaker 106 corresponding to an input item "file format" of the setting table 300.

A user utters "Encrypted PDF. Encryption key is" according to the guidance information.

The voice reception unit 200 receives the voice input "Encrypted PDF. Encryption key is" via the microphone 108 and outputs the voice input "Encrypted PDF. Encryption key is" to the voice recognition unit 202. The voice recognition unit 202 recognizes information of the voice input "Encrypted PDF. Encryption key is" and outputs the information to the setting unit 206. The setting unit 206 sets the information ("encrypted PDF") in an input example column corresponding to the input item "file format".

Furthermore, in a case where the file format is "encrypted PDF", the setting unit 206 adds an input item encryption key required for encryption to the setting table.

In addition, the setting unit 206 determines that the utterance corresponds to the input item "encryption key" and confirms a confidential flag corresponding to the item. The confidential flag of the item is "present".

The masking signal output unit 208 outputs a masking signal while a user is uttering a word. That is, a user utters "Encryption key is", and then a masking signal is output while the user is uttering "123".

The voice reception unit 200 receives the voice input "123" via the microphone 108 and outputs the voice input "123" to the voice recognition unit 202. The voice recognition unit 202 recognizes information of the voice input "123" and outputs the information to the setting unit 206.

The setting unit 206 sets the information in an input example column corresponding to the input item "encryption key".

Next, the guidance information output unit 204 outputs "What is password?" via the speaker 106 corresponding to an input item "password" of the setting table 300.

A user utters "Abc123" according to the guidance information.

The voice reception unit 200 receives the voice input "Abc123" via the microphone 108 and outputs the voice input "Abc123" to the voice recognition unit 202. The voice recognition unit 202 recognizes information of the voice input "Abc123" and outputs the information to the setting unit 206. The setting unit 206 sets the information in an input example column corresponding to the input item "password". Note that the confidential flag of the item is "present". The masking signal output unit 208 outputs a masking signal while a user is uttering a word. As a result, it is possible to prevent user's information that should be confidential from being transmitted to another person. For example, the guidance information output unit 204 outputs "What is password?" via the speaker 106, and then outputs a masking signal according to a confidential flag. The guidance information output unit 204 may continuously output a masking signal until the voice recognition unit 202 receives voice input. Alternatively, the voice recognition unit 202 may continuously output a masking signal until the voice recognition unit 202 recognizes voice input.

Next, the guidance information output unit 204 outputs "What is destination?" via the speaker 106 corresponding to an input item "destination" of the setting table 300.

A user utters "Suzuki@hoge.com" according to the guidance information.

The voice reception unit 200 receives the voice input "Suzuki@hoge.com" via the microphone 108 and outputs the voice input "Suzuki@hoge.com" to the voice recognition unit 202. The voice recognition unit 202 recognizes information of the voice input "Suzuki@hoge.com" and outputs the information to the setting unit 206. The setting unit 206 sets the information in an input example column corresponding to the input item "destination". Note that the confidential flag of the item is "present". The masking signal output unit 208 outputs a masking signal while a user is uttering a word. As a result, it is possible to prevent user's information that should be confidential from being transmitted to another person. For example, the guidance information output unit 204 outputs "What is destination?" via the speaker 106, and then outputs a masking signal according to a confidential flag. The guidance information output unit 204 may continuously output a masking signal until the voice recognition unit 202 receives voice input. Alternatively, the voice recognition unit 202 may continuously output a masking signal until the voice recognition unit 202 recognizes voice input.

Figure 22:
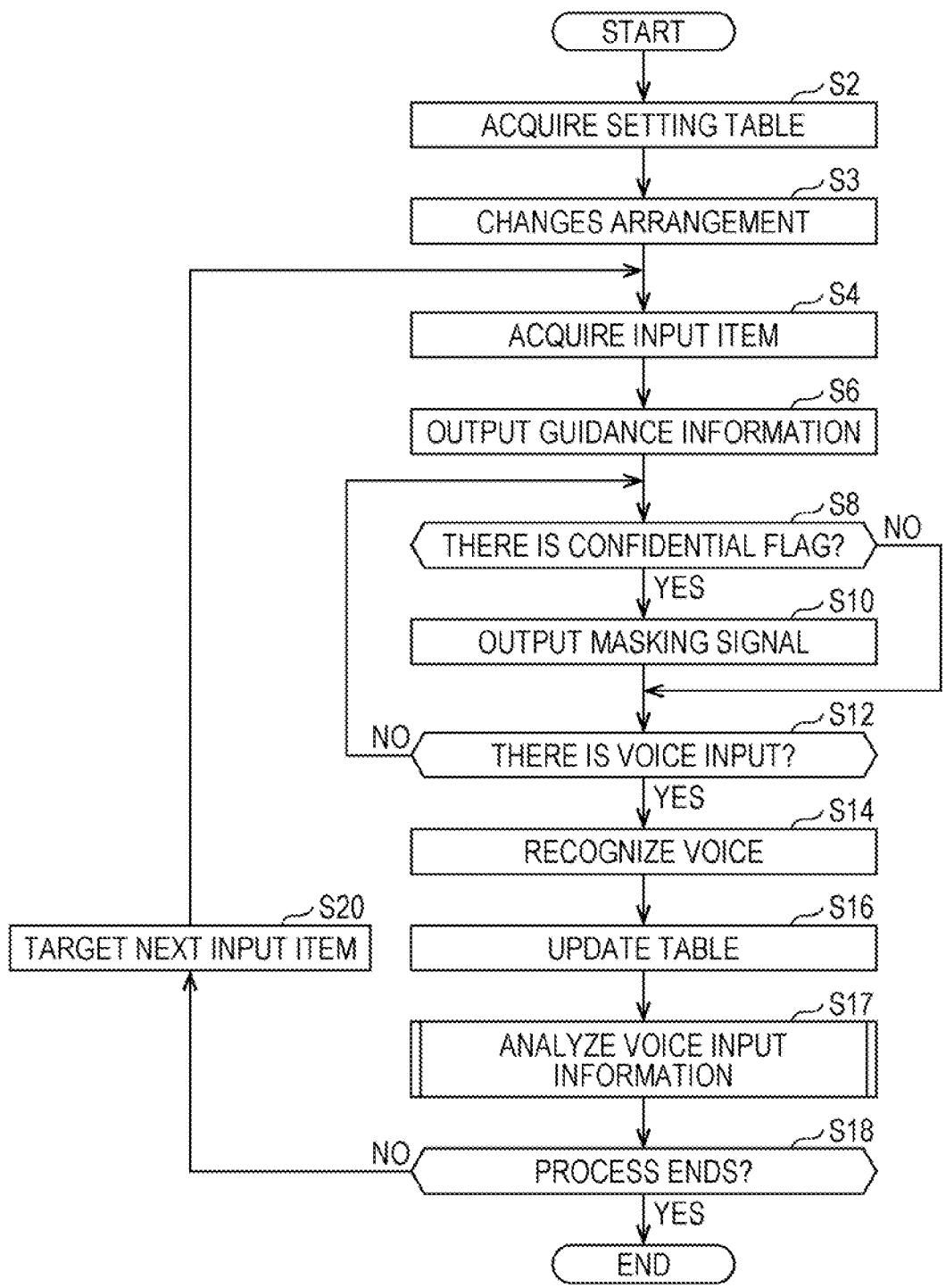
FIG. 22 is a flowchart for explaining a flow of a process of setting a predetermined function of the image forming apparatus according to the fifth embodiment.

FIG. 22 is a flowchart for explaining a flow of a process of setting a predetermined function of the image forming apparatus 1 according to the fifth embodiment.

With reference to FIG. 22, the flow of FIG. 22 is different from the flow of FIG. 12 in that step S17 is added.

Specifically, following step S16, a process of analyzing voice input information is executed (step S17). Since other points are similar, detailed description thereof will not be repeated.

Figure 23:
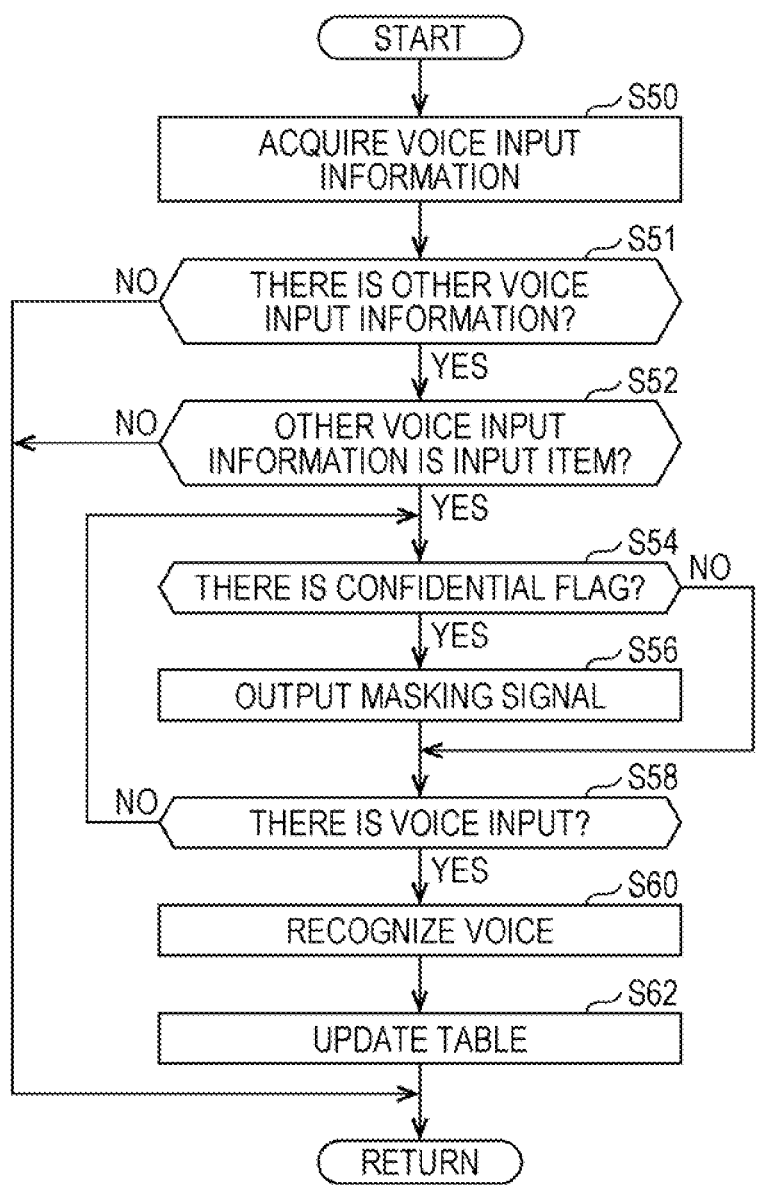
FIG. 23 is a flowchart of a subroutine of a process of analyzing voice input information of the image forming apparatus according to the fifth embodiment.

FIG. 23 is a flowchart of a subroutine of a process of analyzing voice input information of the image forming apparatus 1 according to the fifth embodiment.

With reference to FIG. 23, the setting unit 206 acquires voice input information recognized by the voice recognition unit 202 (step S50).

Next, the setting unit 206 determines whether or not voice input information other than an input item is included (step S51).

Next, if the setting unit 206 determines that voice input information other than an input item is included (YES in step S51), the setting unit 206 determines whether or not the other voice input information is an input item (step S52).

In step S52, if the setting unit 206 determines that the other voice input information is an input item (YES in step S52), the setting unit 206 determines whether or not there is a confidential flag corresponding to the input item (step S54).

In step S54, if it is determined that there is a confidential flag corresponding to the input item (YES in step S54), the setting unit 206 instructs the masking signal output unit 208 to output a masking signal (step S56). As a result, the masking signal output unit 208 outputs a masking signal via the speaker 106.

Then, the voice reception unit 101 determines whether or not voice input from a user has been received via a microphone (step S58).

In step S58, if the voice reception unit 101 receives voice input from a user via a microphone (YES in step S58), the voice recognition unit 202 recognizes information input by user's voice and outputs the information to the setting unit 206 (step S60).

Meanwhile, in step S58, if the voice reception unit 101 does not receive voice input from a user via a microphone (NO in step S58), the process returns to step S54, and the above processes are repeated.

Next, the setting unit 206 sets (updates) the information output from the voice recognition unit 202 to a corresponding item of the setting table 100 (step S62).

Then, the process ends (return).

Meanwhile, in step S51, if the setting unit 206 determines that voice input information other than an input item is not included (NO in step S51), the process ends (return).

In step S52, if the setting unit 206 determines that the other voice input information is not an input item (NO in step S52), the process ends (return).

In step S54, if the setting unit 206 determines that there is no confidential flag corresponding to the input item (NO in step S54), the process skips step S56 and proceeds to step S58.

As described with reference to FIG. 21, in a case where a user utters "Encrypted PDF. Encryption key is" according to guidance information, the setting unit 206 determines that the "encryption key" is an input item. Then, the setting unit 206 instructs the masking signal output unit 208 to output a masking signal according to a confidential flag corresponding to the "encryption key". Therefore, it is possible to output a masking signal even in a case where an "encryption key" which is highly confidential information is uttered at a timing intended by a user, and to suppress information leakage.

It should be considered that the embodiments disclosed here are illustrative in all respects and not restrictive. The scope of the present invention is defined not by the above description but by the claims and intends to include all modifications within meaning and scope equivalent to the claims.

Although embodiments of the present invention have been described and illustrated in detail, the disclosed embodiments are made for purposes of illustration and example only in all respects and not limitation. The scope of the present invention should be interpreted by terms of the appended claims and intends to include all modifications within meaning and scope equivalent to the claims.

What is claimed is:

1. An image forming apparatus comprising:
a first hardware processor that outputs guidance information for setting a predetermined function to a user;
a second hardware processor that receives voice input from the user according to the guidance information;
a third hardware processor that executes a process of setting the predetermined function according to the voice input received by the second hardware processor; and
a fourth hardware processor that outputs a masking signal for masking voice from the user based on the guidance information;
wherein
the setting of a predetermined function includes an item of setting information with high confidentiality and an item of setting information with low confidentiality, and
the fourth hardware processor
outputs a masking signal for masking voice from the user in a case where the guidance information prompts input of the item of setting information with high confidentiality, and
does not output a masking signal for masking voice from the user in a case where the guidance information prompts input of the item of setting information with low confidentiality.

2. The image forming apparatus according to claim 1, wherein
the setting of a predetermined function includes a plurality of the items of setting information with high confidentiality and a plurality of the items of setting information with low confidentiality, and
the first hardware processor outputs the guidance information such that the information that prompts input of the plurality of items of setting information with high confidentiality is continuously output.

3. The image forming apparatus according to claim 1, further comprising
a fifth hardware processor that determines whether or not there is a person other than the user, wherein
the fourth hardware processor
outputs a masking signal for masking voice from the user based on the guidance information in a case where the fifth hardware processor determines that there is the other person, and
does not output a masking signal for masking voice from the user in a case where the fifth hardware processor determines that there is not the other person.

4. The image forming apparatus according to claim 1, wherein
the third hardware processor
sequentially executes processes of setting a plurality of setting items as the setting of a predetermined function,
determines validity of each of the processes of setting the plurality of setting items, and
notifies the first hardware processor in a case where it is determined that at least one of the processes of setting the plurality of setting items is invalid, and
the first hardware processor outputs guidance information on the invalid setting item.

5. The image forming apparatus according to claim 1, further comprising
a sixth hardware processor that recognizes voice input received by the second hardware processor and outputs the voice input to the third hardware processor, wherein
the third hardware processor
determines whether or not voice input information recognized by the sixth hardware processor is information with high confidentiality, and
notifies the fourth hardware processor in a case where it is determined that the voice input information is the information with high confidentiality, and
the fourth hardware processor outputs the masking signal for masking voice from the user.

6. A method for controlling an image forming apparatus, comprising:
outputting guidance information for setting a predetermined function to a user, wherein the setting of a predetermined function includes an item of setting information with high confidentiality and an item of setting information with low confidentiality;
receiving voice input from the user according to the guidance information;
executing a process of setting the predetermined function according to the received voice input; and
outputting a masking signal for masking voice from the user based on the guidance information in a case where the guidance information prompts input of the item of setting information with high confidentiality; and
not outputting a masking signal for masking voice from the user in a case where the guidance information prompts input of the item of setting information with low confidentiality.

* * * * *